United States Patent
Weiers

(10) Patent No.: US 11,183,935 B2
(45) Date of Patent: Nov. 23, 2021

(54) CURRENT CONTROL FOR BUCK-BOOST CONVERTERS USING CONDITIONAL OFFSETS

(71) Applicant: Microchip Technology Incorporated, Chandler, AZ (US)

(72) Inventor: Stefan Weiers, Heidelberg (DE)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 16/667,989

(22) Filed: Oct. 30, 2019

(65) Prior Publication Data

US 2020/0295657 A1   Sep. 17, 2020

Related U.S. Application Data

(60) Provisional application No. 62/818,135, filed on Mar. 14, 2019.

(51) Int. Cl.
*H02M 3/158*     (2006.01)
*H02M 1/00*      (2006.01)

(52) U.S. Cl.
CPC ........ *H02M 3/1582* (2013.01); *H02M 1/0025* (2021.05)

(58) Field of Classification Search
CPC .................................................. H02M 3/1582
See application file for complete search history.

(56) References Cited

U.S. PATENT DOCUMENTS

| | | | |
|---|---|---|---|
| 2006/0198170 A1 | 9/2006 | Kasai et al. | 363/40 |
| 2010/0085028 A1 | 4/2010 | Moussaoui | 323/284 |
| 2011/0089915 A1 | 4/2011 | Qiu et al. | 323/271 |
| 2012/0146602 A1 | 6/2012 | Chen et al. | 323/282 |

FOREIGN PATENT DOCUMENTS

EP   3002860 B2   4/2016   .............. G05F 1/00

OTHER PUBLICATIONS

International Search Report and Written Opinion, Application No. PCT/US2019/060403, 11 pages, dated Mar. 23, 2020.

*Primary Examiner* — Peter M Novak
(74) *Attorney, Agent, or Firm* — Slayden Grubert Beard PLLC

(57) ABSTRACT

A power converter includes an inductor, boost and buck circuits, and a controller circuit. The controller circuit is configured to determine a current through the inductor, generate a buck reference for comparison with the current to control operation of the buck circuit, calculate a variable offset based upon input and output potentials of the power converter and apply the variable offset to the buck reference to generate a boost reference, compare the boost reference with the current to control operation of the boost circuit, and, based upon comparisons of the current with the buck reference and the boost reference, respectively, operate the boost circuit and the buck circuit.

20 Claims, 13 Drawing Sheets

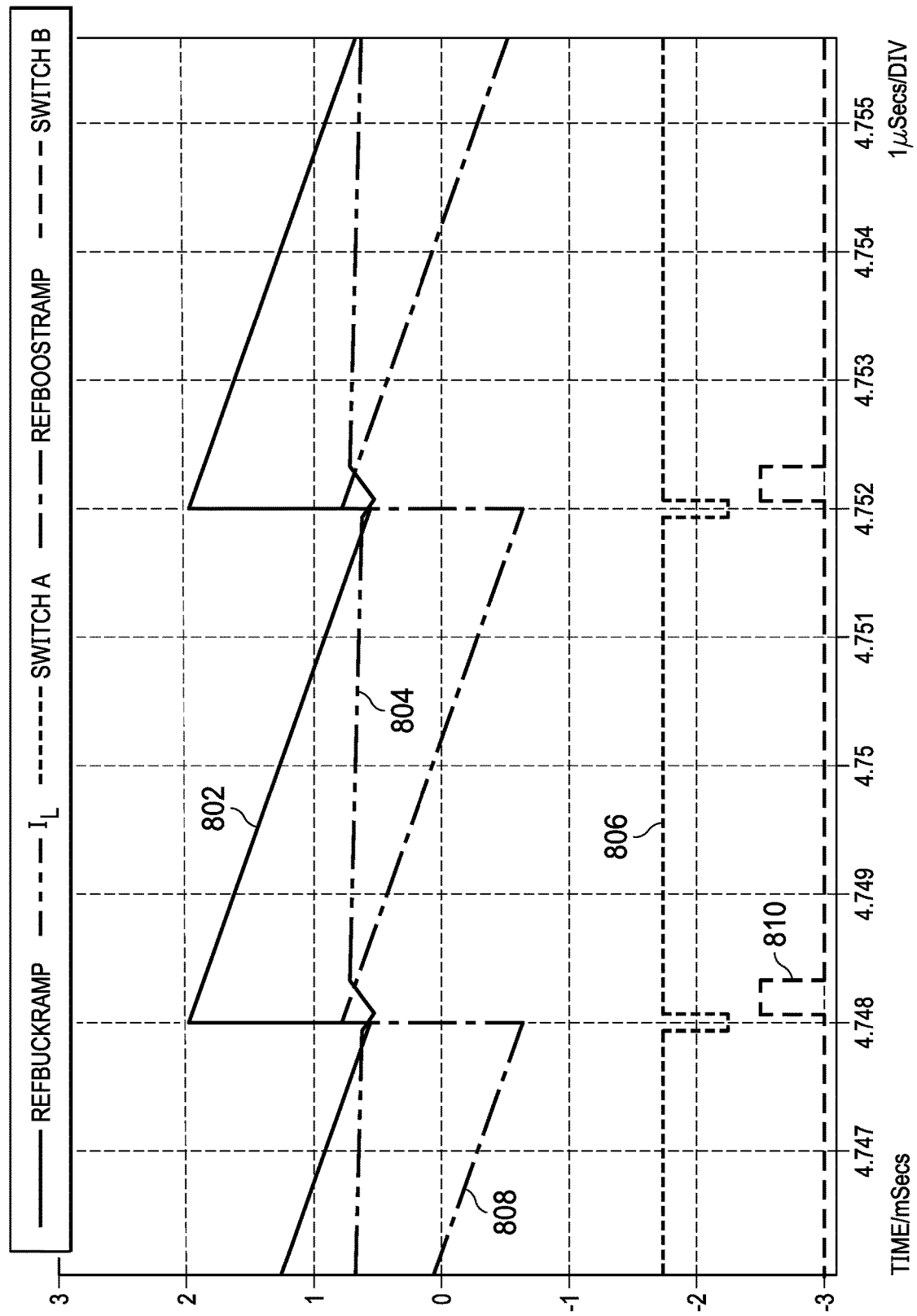

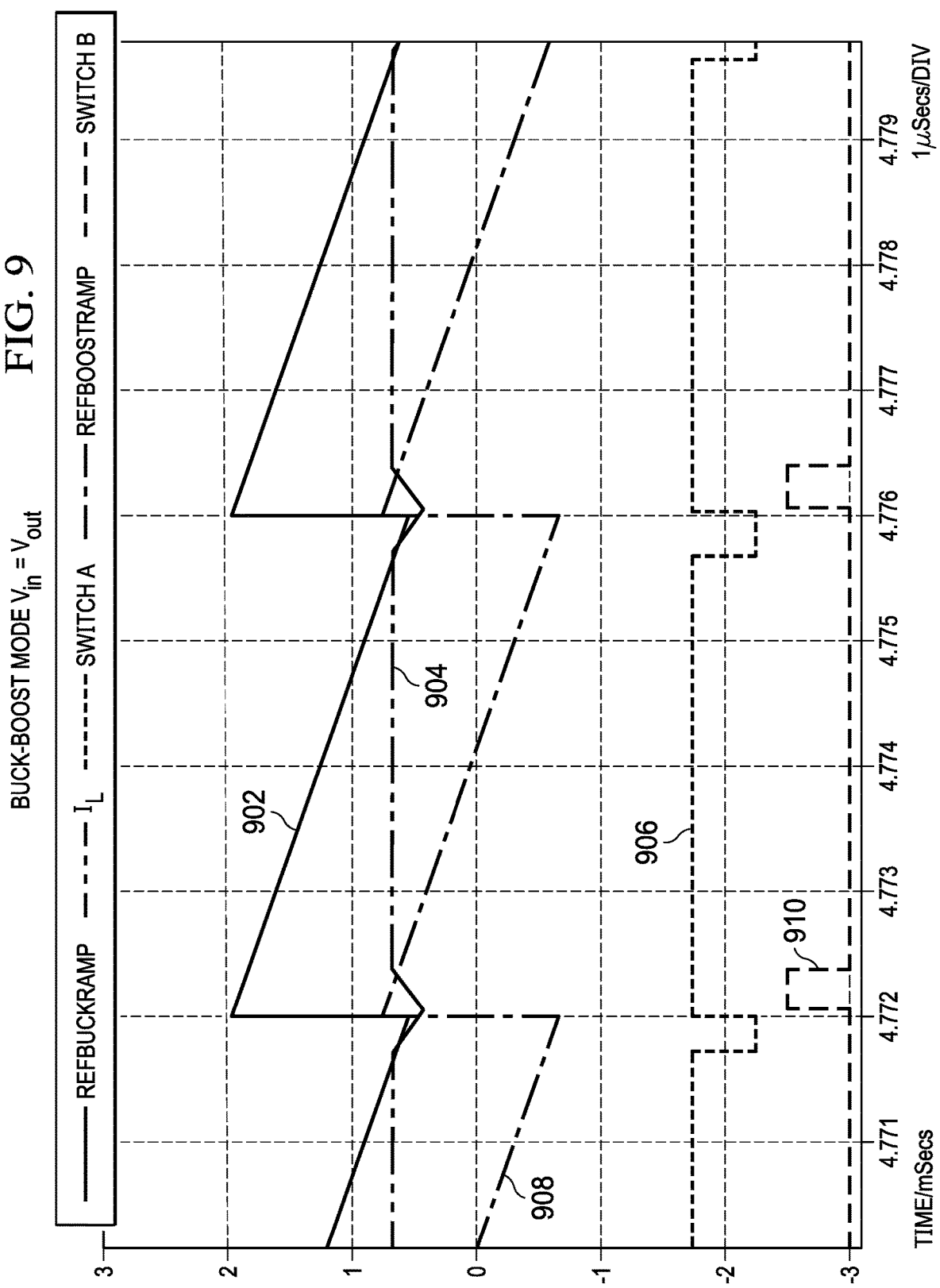

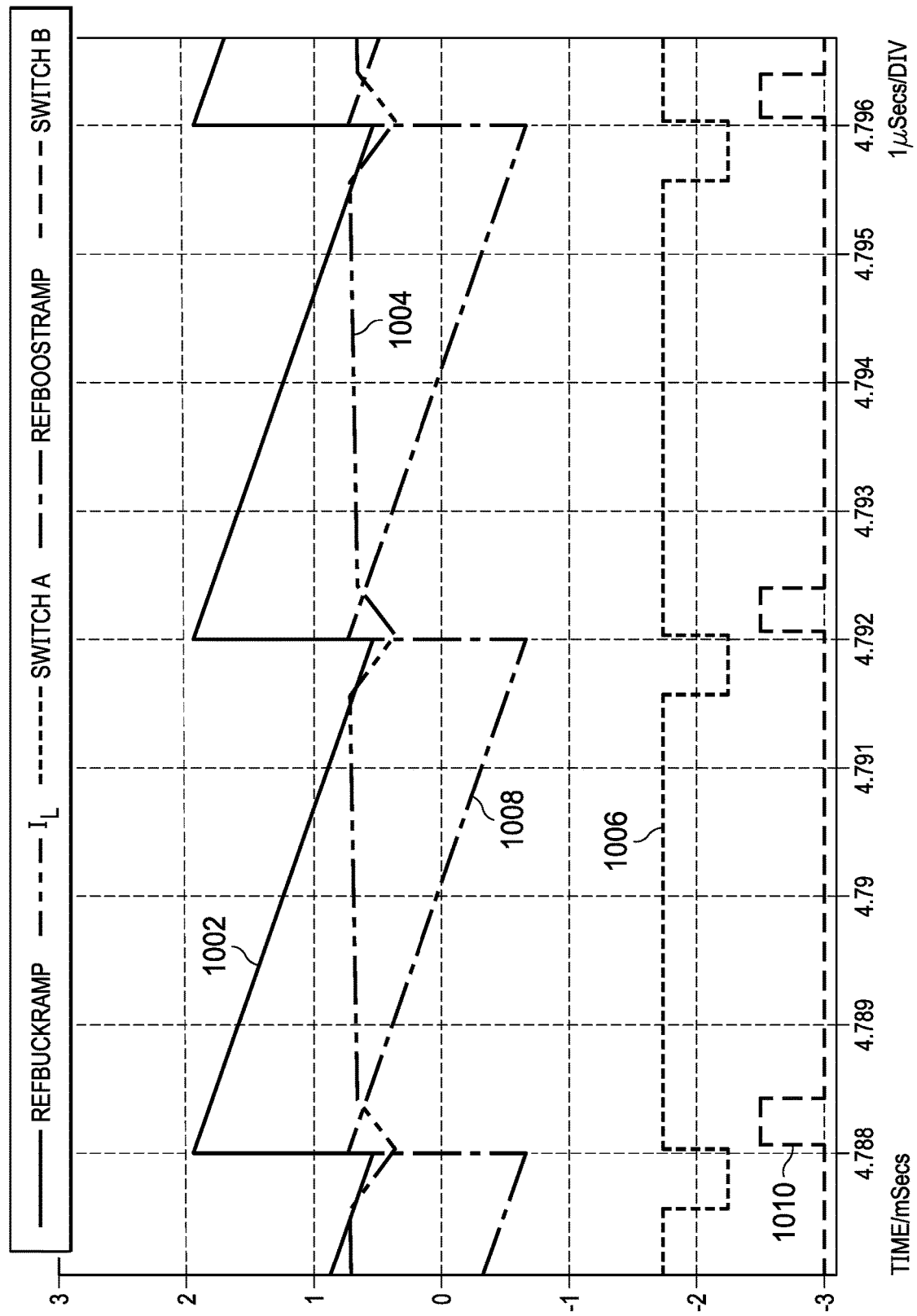

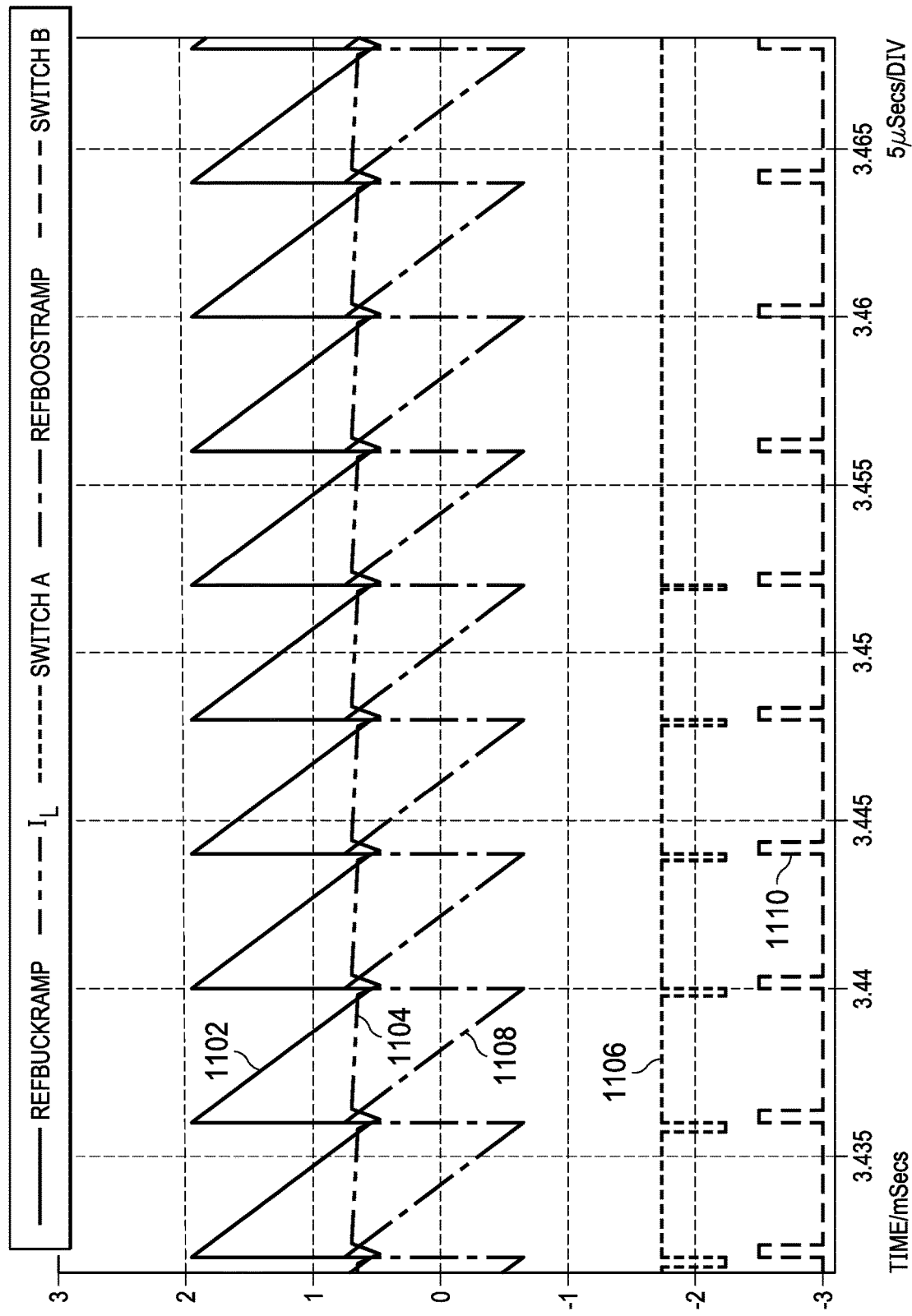

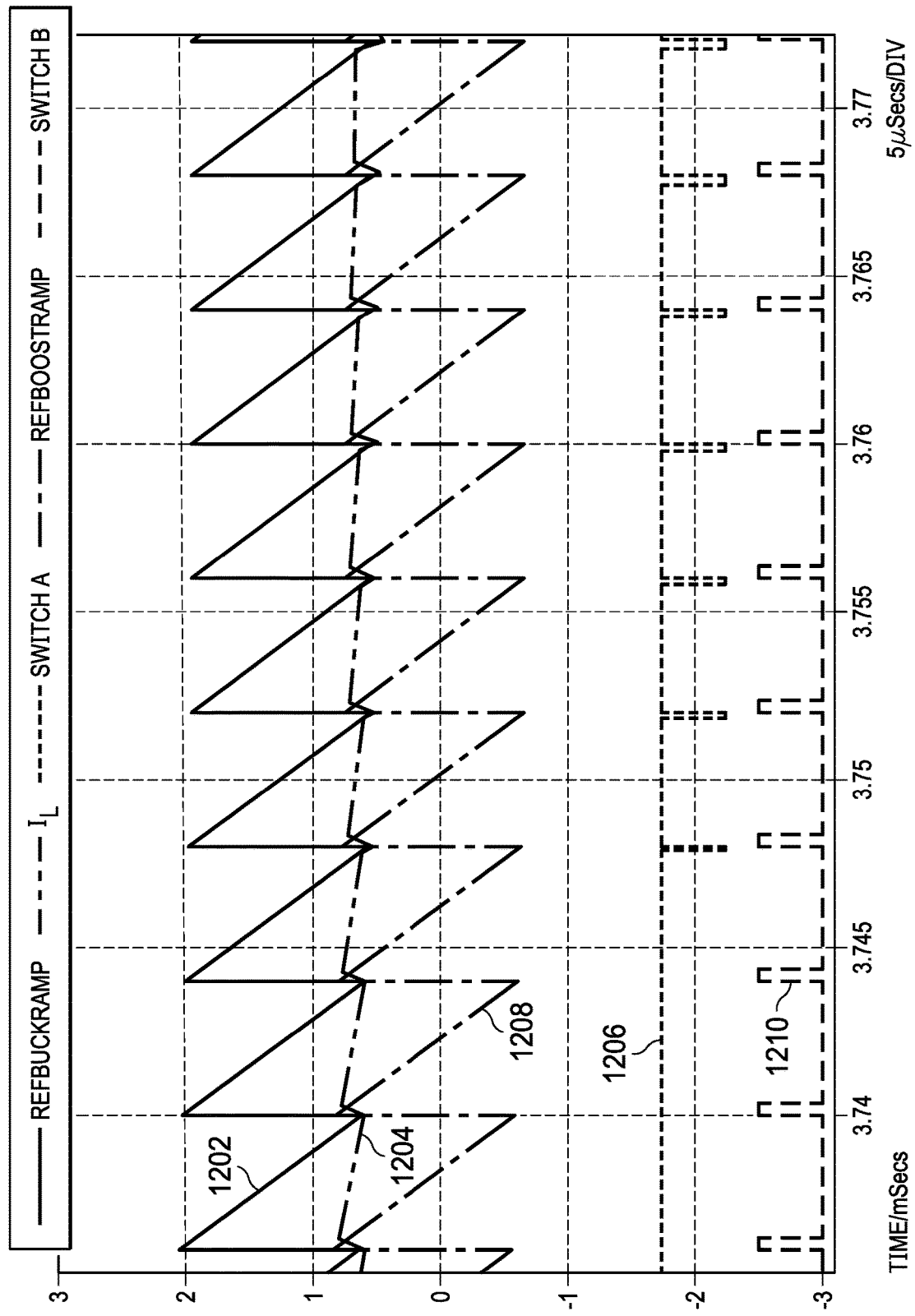

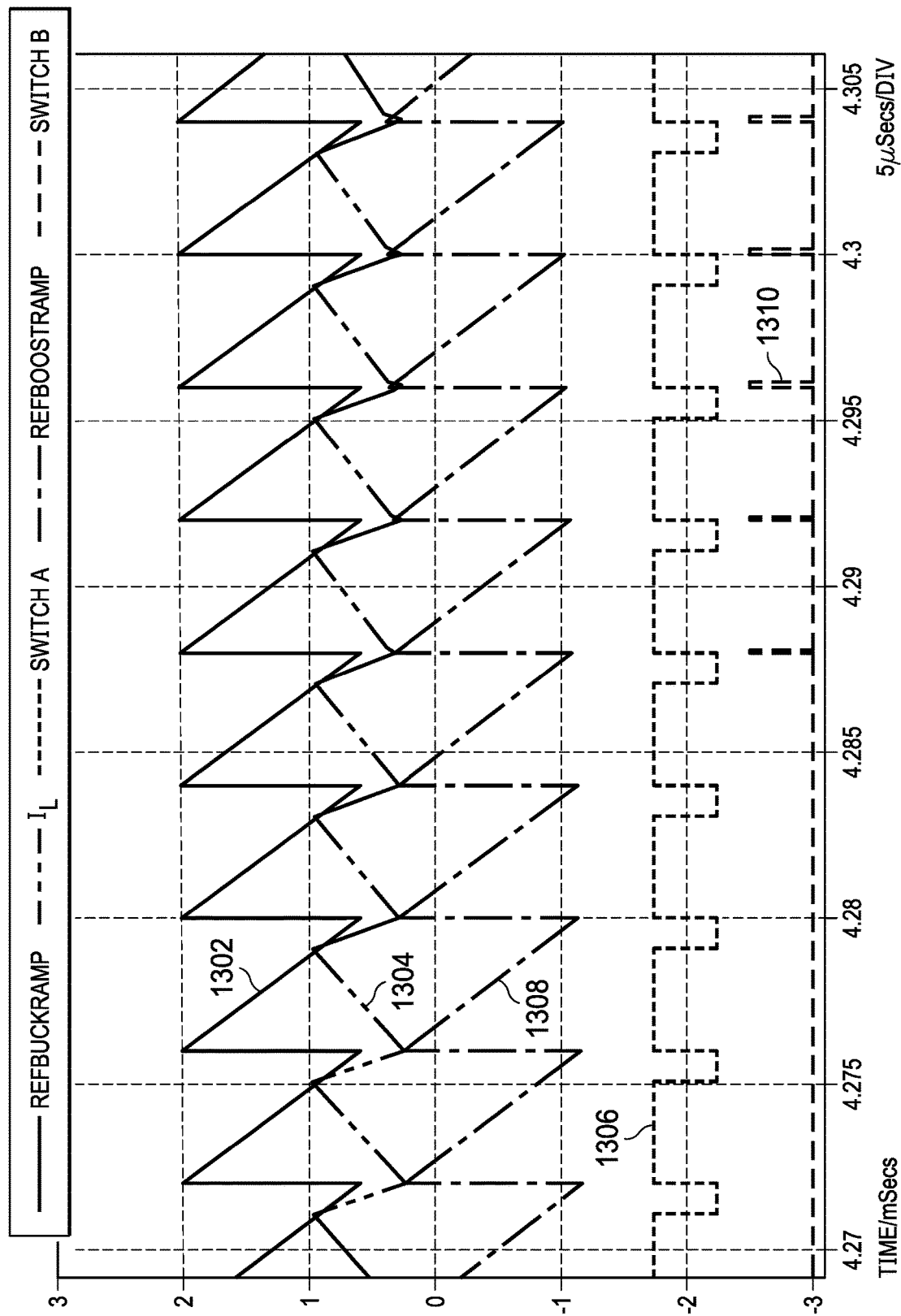

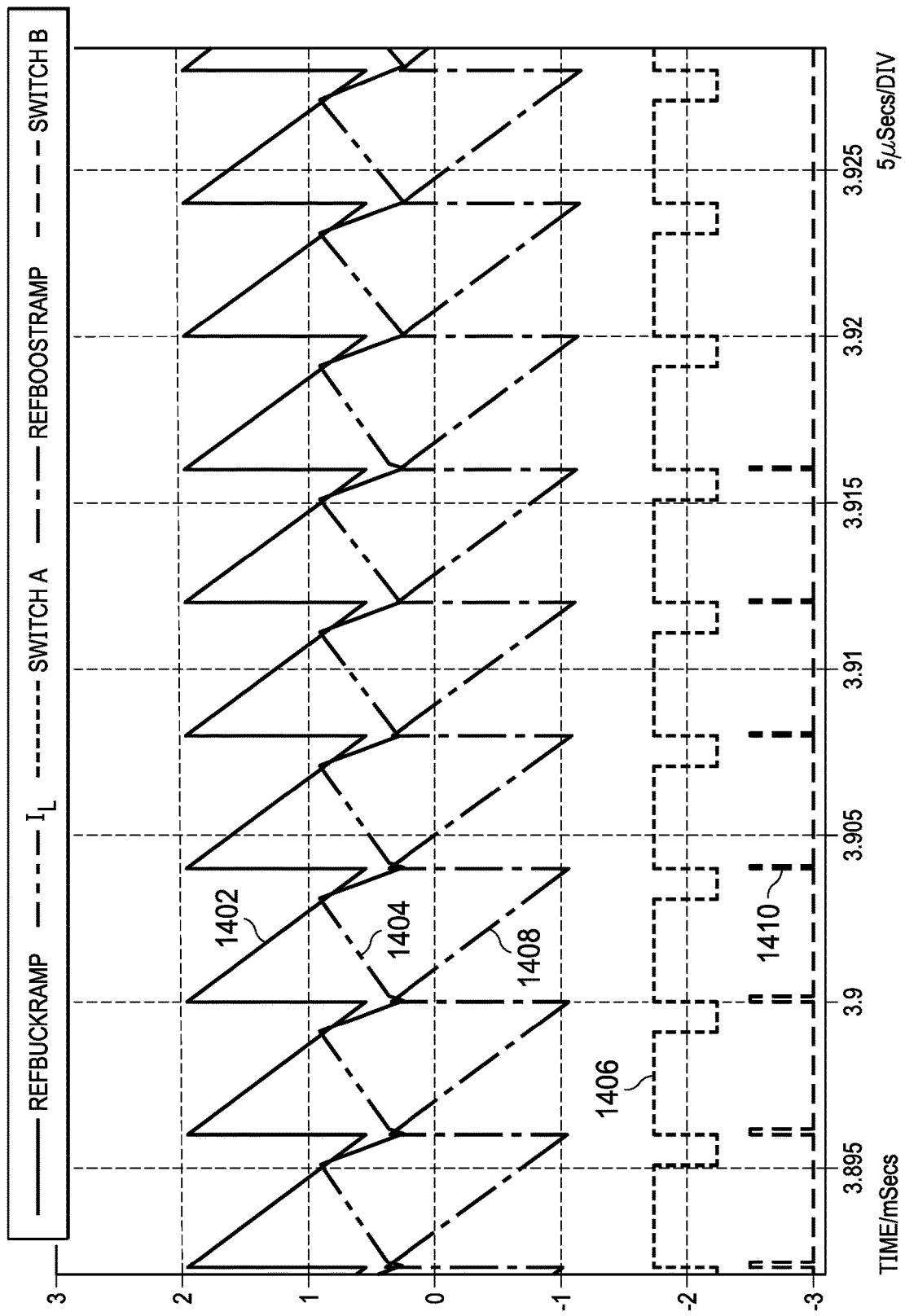

CURRENT CONTROL FOR BUCK-BOOST CONVERTERS USING CONDITIONAL OFFSETS

PRIORITY

The present application claims priority to U.S. Provisional Application No. 62/818,135, filed Mar. 14, 2019, the contents of which are hereby incorporated in their entirety.

TECHNICAL FIELD

The present disclosure relates to methods and systems for power conversion and, more particularly, to current control of buck-boost converters using conditional offsets.

BACKGROUND

Buck-boost converters may convert an input direct current (DC) voltage to a higher or lower output DC voltage. Buck-boost converters may operate with a buck or step-down functionality wherein buck legs, or sub-circuits, are in operation to convert an input voltage to a lower output voltage. Buck-boost converters may operate with a boost or step-up functionality, wherein boost legs, or sub-circuits, are in operation to convert an input voltage to a higher output voltage. Furthermore, buck-boost converters may operate with a buck-boost functionality, wherein buck legs and boost legs are both in operation at the same time, and the converter may convert DC voltage to a higher or a lower voltage. Buck-boost converters may be made with an inverting topology or a non-inverting topology. In an inverting topology, a buck-boost converter may produce output voltage that has an opposite polarity as the input voltage to the buck-boost converter. In a non-inverting topology, a buck-boost converter may produce output voltage that has a same polarity as the input voltage to the buck-boost converter.

In order to accomplish a buck-boost converter that may operate with buck, boost, and buck-boost functionality, the buck-boost converter may be implemented in a four-switch topology. The four-switch topology may enable operation of the converter alternately in buck, boost, and buck-boost mode.

The transition between buck, boost, and buck-boost functionality may be triggered or handled by a forced mode transition approach. This approach utilizes comparators for monitoring the input voltage and partitioning the input voltage range into zones from lowest to highest input voltage, one each for boost, buck-boost, and buck operation. As input voltage reaches a different range, different parts of the circuit may be switched on and off. This approach may have poor output performance during transitions between boost, buck-boost, and buck operation. Voltage drop and overshoot normally occur at the converter transitions from one operation to another.

The transition between buck, boost, and buck-boost functionality may be triggered or handled by an automatic mode transition using voltage mode control. This approach utilizes an offset voltage added to a ramp voltage to generate two separate predefined voltage ramps. The separated ramp voltages are in turn compared with the output of an error amplifier. The error amplifier compares the output of the buck-boost converter with a defined, target value. The output of the error amplifier may generate pulse width modulation (PWM) signals. However, this approach is limited to voltage mode-controlled converters. This causes drawbacks such as a slow response to changes in the load.

Another approach may include automatic mode transition with peak current mode control, which uses two current ramps and compares these ramps with an output of a voltage-loop compensator to generate PWM signals. One of the current ramps is generated by sensing an inductor current and the other current ramp is generated by adding a pedestal to the first current ramp. This approach has drawbacks. It is very difficult to define an appropriate pedestal voltage to achieve a perfect matching between the two current ramps with a minimum of overlap and no gaps between the ramps. To maintain correct regulation, there should preferably be no gap between buck and boost operation regions. To ensure this, both regions may overlap somewhat to account for possible component tolerances. However, overlap causes an efficiency penalty due to increased switching losses in the buck-boost region, as all four switches are switched during one cycle. Therefore, the overlap or buck-boost region should preferably not be larger than needed. Due to the non-ideality of components, such as capacitors and inductors, there are times when the current ramps overlap but there are also times when the current ramps separate. The larger the overlap, the more that the converter will work in buck-boost operation, reducing efficiency. The larger the separation, the more the converter will operate in a mode in which regulation is not working correctly, wherein the output of the converter is not regulated but defined by the load of the converter.

Yet another approach may include automatic mode transition with average current mode control. This approach uses two artificial current ramps which are compared in turn to the output of an average current-loop compensator to generate PWM signals. Like in automatic mode transition with peak current mode control, one ramp is superimposed over another ramp. However, this approach may require a complicated compensation network. When targeting large ranges for input, output, and load, stable operation of the converter under all conditions is very difficult.

The disadvantages of various converters described above have been recognized and identified by inventors of embodiments of the present disclosure. Embodiments of the present disclosure may provide converters with automatic mode transition that solve at least some of such identified problems, such as bad performance between boost, buck-boost, and buck operation, slow response to changes in a load of the converter, difficult implementation of compensation under various operating conditions, misalignment of current ramps, a complicated compensation network, and stable operation over large ranges of input, output, and load values.

BRIEF DESCRIPTION OF THE DRAWINGS

FIG. 8 is an illustration of operation of a system in buck-boost mode wherein input voltage is less than output voltage, according to embodiments of the present disclosure.

FIG. 9 is an illustration of operation of a system in buck-boost mode wherein input voltage is equal to output voltage, according to embodiments of the present disclosure.

FIG. 10 is an illustration of operation of a system in buck-boost mode wherein input voltage is greater than output voltage, according to embodiments of the present disclosure.

FIG. 11 is an illustration of example operation of a system during transition between buck-boost mode and boost mode while output voltage is increasing, according to embodiments of the present disclosure.

FIG. 12 is an illustration of example operation of a system during transition between boost mode and buck-boost mode while output voltage is decreasing, according to embodiments of the present disclosure.

FIG. 13 is an illustration of example operation of a system during transition between buck mode and buck-boost mode while output voltage is increasing, according to embodiments of the present disclosure.

FIG. 14 is an illustration of example operation of a system during transition between buck-boost mode and buck mode while output voltage is decreasing, according to embodiments of the present disclosure.

SUMMARY

Figure 1:
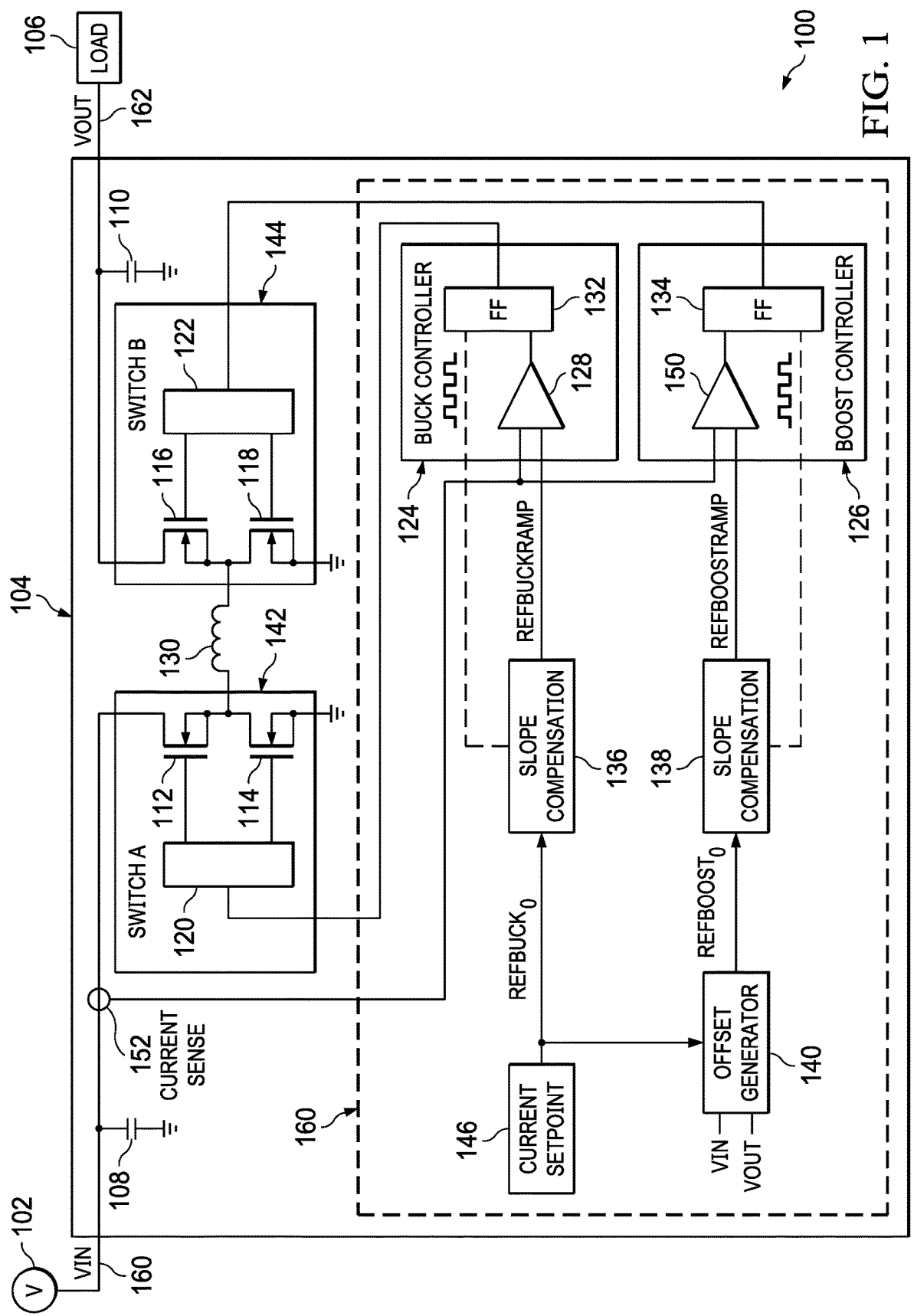
FIG. 1 is an illustration of a system providing conversion of power using conditional offsets, according to embodiments of the present disclosure.

Embodiments of the present disclosure include a power converter. The power converter may include an inductor, a boost leg circuit coupled to a first end of the inductor, and a buck leg circuit coupled to a second end of the inductor. The leg circuits may be implemented in any suitable manner, such as by analog circuitry, digital circuitry, instructions for execution by a processor, or any suitable combination thereof. The leg circuits may each include at least two transistors, implemented by any suitable type. The leg circuits may be connected to each other through the inductor at midpoints between transistors in the respective leg circuit. The boost leg circuit may be configured to operate the power converter in boost mode. The buck leg circuit may be configured to operate the power converter in buck mode. The buck and boost leg circuits may also be connected to any suitable driver circuits. The power converter may include a controller circuit configured to determine a current through the inductor, generate a buck reference configured to be compared with the current through the inductor to control operation of the buck leg circuit, calculate a variable offset based upon input and output potentials of the power converter and apply the variable offset to the buck reference to generate a boost reference, compare the boost reference with the current through the inductor to control operation of the boost leg circuit, and, based upon comparisons of the current through the inductor with the buck reference and the boost reference, respectively, operate the boost leg circuit and the buck leg circuit.

In combination with any of the above embodiments, the controller circuit may include buck and boost controller circuits, implemented by analog circuitry, digital circuitry, instructions for execution by a processor, or any suitable combination thereof. The controller circuit may include slope compensation circuits configured to generate ramp signals to input into the buck and boost controller circuits. The ramp signal for the buck controller may be based upon a current setpoint. The ramp signal for the boost controller may be based upon the current setpoint in combination with the variable offset. The variable offset may be calculated using analog circuitry, digital circuitry, instructions for execution by a processor, or any suitable combination thereof. The variable offset may be generated according to voltage input and voltage output of the converter. If voltage input is less than voltage output plus a voltage factor, then the variable offset may be a particular voltage, V0. Otherwise, the variable offset may be the particular voltage plus a multiplication factor times the sum of voltage input, negative voltage output, and negative voltage factor. V0 might be 1.2V and the voltage factor may be 1.

In combination with any of the above embodiments, the controller circuit may be further configured to generate the buck reference as a buck reference ramp and generate the boost reference as a boost reference ramp, wherein the buck reference ramp and the boost reference ramp are separated by the variable offset.

In combination with any of the above embodiments, the controller circuit may be further configured to calculate the variable offset according to an instant input potential to the power converter.

In combination with any of the above embodiments, the controller circuit may be further configured to calculate the variable offset according to an instant output potential from the power converter.

In combination with any of the above embodiments, the controller circuit may be further configured to calculate the variable offset as a constant value when the input potential to the power converter is less than the sum of the output potential and a fixed voltage.

In combination with any of the above embodiments, the controller circuit may be further configured to, when the input potential to the power converter is greater than the sum of the output potential and a fixed voltage, vary the variable offset according to the input potential and the output potential.

In combination with any of the above embodiments, the controller circuit may be further configured to, when the input potential is greater than the sum of output potential and the fixed voltage, vary the variable offset linearly with respect to a difference between the input potential and a sum of the output potential and the fixed voltage.

In combination with any of the above embodiments, the variable offset may be configured to change thresholds to operate the power converter in boost mode, buck-boost mode, or buck mode.

The controller circuit may be implemented by analog circuitry, digital circuitry, instructions for execution by a processor, or any suitable combination thereof.

Embodiments of the present disclosure may include a system. The system may include a voltage input, a load, and any of the power converters of the above embodiments, configured to provide voltage to the load based on the voltage input. The system may include a microcontroller, power adapter, power supply, microprocessor, tablet, smartphone, computer, vehicle electronics, consumer appliance, or any other suitable electronic device.

Embodiments of the present disclosure may include a method performed by any of the power converters or systems of the above embodiments.

DETAILED DESCRIPTION

FIG. 1 is an illustration of a system 100 providing conversion of power using conditional offsets, according to embodiments of the present disclosure. System 100 may be, for example a power supply, microcontroller, computer, laptop, smart phone, or any other suitable electronic device or system.

System 100 may include a voltage source 102. Voltage source 102 may be a DC voltage source. Voltage source 102 may be implemented in any suitable manner and provide any suitable voltage. System 100 may be configured to provide a regulated voltage level to a load 106. Load 106 may be any suitable consumer of voltage, such as a circuit or other electronic device or component. In order to provide the regulated voltage level to load 106, system 100 may include a voltage regulator 104. The output of voltage source 102 may be designated as VIN as applied at an input port 160 of voltage regulator 104. The voltage provided to load 106 may be designated as VOUT as applied through an output port 162 of voltage regulator connected to load 106.

Voltage regulator 104 may be configured to maintain a fixed DC voltage output as VOUT. Fixed DC voltage output may be maintained across various values of voltage inputs of VIN at input port 160 and across various loads attached to the output of voltage regulator 104 at output port 162. Voltage regulator 104 may be implemented by, for example, a buck-boost converter. In particular, voltage regulator 104 may be implemented as a four-switch, single inductor, buck-boost converter. VOUT may be an output with the same or a different polarity as was provided by VIN.

In one embodiment, voltage regulator 104 may include an input capacitor 108. In another embodiment, input capacitor 108 may be implemented outside of voltage regulator 104. Input capacitor 108 may be connected between at input port 160 and ground. In one embodiment, voltage regulator may include an output capacitor 110. In another embodiment, output capacitor 110 may be implemented outside of voltage regulator 104. Output capacitor 110 may be connected between output port 162 and ground.

Voltage regulator 104 may include a buck leg 142 and a boost leg 144. Buck leg 142 may be configured to provide switching to operate voltage regulator 104 in buck mode. Buck leg 142 may be configured to lower VIN so as to meet a target voltage for VOUT. Boost leg 144 may be configured to provide switching to operate voltage regulator 104 in boost mode. Boost leg 144 may be configured to raise VIN so as to meet a target voltage for VOUT. If voltage regulator 104 is utilizing only buck leg 142, voltage regulator 104 may be said to be operating in buck mode. If voltage regulator 104 is utilizing only boost leg 144, regulator 104 may be said to be operating in boost mode. If voltage regulator 104 is utilizing both buck leg 142 and boost leg 144, voltage regulator 104 may be said to be operating in buck-boost mode.

Buck leg 142 may include a high side transistor 112 and a low side transistor 114 connected in series. Transistors 112, 114 may be implemented as n-channel MOSFETs. VIN may be applied to the drain of high side transistor 112 through input port 160. The source of high side transistor 112 may be connected to the drain of low side transistor 114. The source of low side transistor 114 may be connected to ground. The gates of each of transistors 112, 114 may be connected to a buck driver circuit 120. Buck driver circuit 120 may be implemented by any suitable combination of analog or digital circuitry. Buck driver circuit 120 may be configured to issue gate control signals to switch transistors 112, 114 on or off according to desired operation of voltage regulator 104.

Boost leg 144 may include a high-side transistor 116 and a low side transistor 118 connected in series. Transistors 116, 118 may be implemented as n-channel MOSFETs. VOUT may be provided to the drain of high-side transistor 116 through output port 162. The source of high-side transistor 116 may be connected to the drain of low side transistor 118. The source of low side transistor 118 may be connected to ground. The gates of each of transistors 116, 118 may be connected to a boost driver circuit 122. Boost driver circuit 122 may be implemented by any suitable combination of analog or digital circuitry. Boost driver circuit 122 may be configured to issue gate control signals to switch transistors 116, 118 on or off according to desired operation of voltage regulator 104.

Voltage regulator 104 may include an inductor 150. Inductor 150 may be connected between the sources of transistors 112, 116, and between the drains of transistors 114, 118. Buck leg 142 may be configured to act as a switch, denoted herein as switch A, to connect a first terminal of inductor 150 to either VIN at input port 160 or to ground. Boost leg 144 may be configured to act as a switch, denoted herein as switch B to connect a second terminal of inductor 150 to either VOUT at output port 162 or to ground.

Buck leg 142 and boost leg 144 may be controlled in any suitable manner. Buck leg 142 and boost leg 144 may be controlled by a controller circuit 160. Controller circuit 160 may be implemented in any suitable manner.

Controller circuit 160 may include a buck controller circuit 124 and a boost controller circuit 126. Buck controller circuit 124 and boost controller circuit 126 may be implemented in any suitable manner, such as by analog circuitry, digital circuitry, or a combination thereof. In one embodiment, control of buck leg 142 and boost leg 144 may be made through peak current control. Thus, buck controller circuit 124 and boost controller circuit 126 may be implemented as peak current mode controllers. Buck controller circuit 124 may be configured to issue switching signals to buck leg 142. Boost controller circuit 126 may be configured to issue switching signals to boost leg 144. The switching signals may be implemented by, for example, PWM signals. The PWM switching signals may be applied through driver circuits 120, 122 to the gates of transistors 112, 114, 116, 118. The control signals applied to the respective gates of transistors 112, 114 may be the inverse, or nearly the inverse, of each other. Likewise, the control signals applied to the respective gates of transistors 116, 118 may be the inverse, or nearly the inverse, of each other. The control signals as provided by driver circuits 120, 122 may buffer an amount of time between switching operations of the respective transistors in order to prevent overlap or other undesired conditions.

Each of buck controller circuit 124 and boost controller circuit 126 may be configured to receive a current setpoint value and a measurement of current. Voltage regulator 104 may include a current sense 152 configured to measure current flowing from input port 160 through inductor 150. A signal representing the value of such an inductor current may be passed to each of buck controller circuit 124 and boost controller circuit 126.

Each of buck controller circuit 124 and boost controllers 126 may be configured to receive a current setpoint value from any suitable source. The current setpoint value may be compared against the present inductor current sensed by current sense 152. The results of such comparison may be used to determine switching signals output by controller circuits 124, 126. The current setpoint value may vary according to VOUT, as changes in VOUT may affect the response of inductor current, which may be used to evaluate in which mode voltage regulator 104 is to operate. Such changes in inductor current are discussed below within the context of FIG. 2.

Each of buck controller circuit 124 and boost controller 126 may include respective comparators 128, 130. Comparator 128 in buck controller circuit 124 may be configured to compare the sensed current from current sense 152 against a current reference for buck mode, denoted REFBUCKRAMP. Comparator 130 in boost controller circuit 126 may be configured to compare the sensed current from current sense 152 against a current reference for boost mode, denoted REFBOOSTRAMP. An output of the comparison from comparators 128, 130 may be sent to flip-flops 132, 134 in each respective controller. Flip-flops 132, 134 may be configured to output switching signals to respective driver circuits 120, 122.

Figure 2:
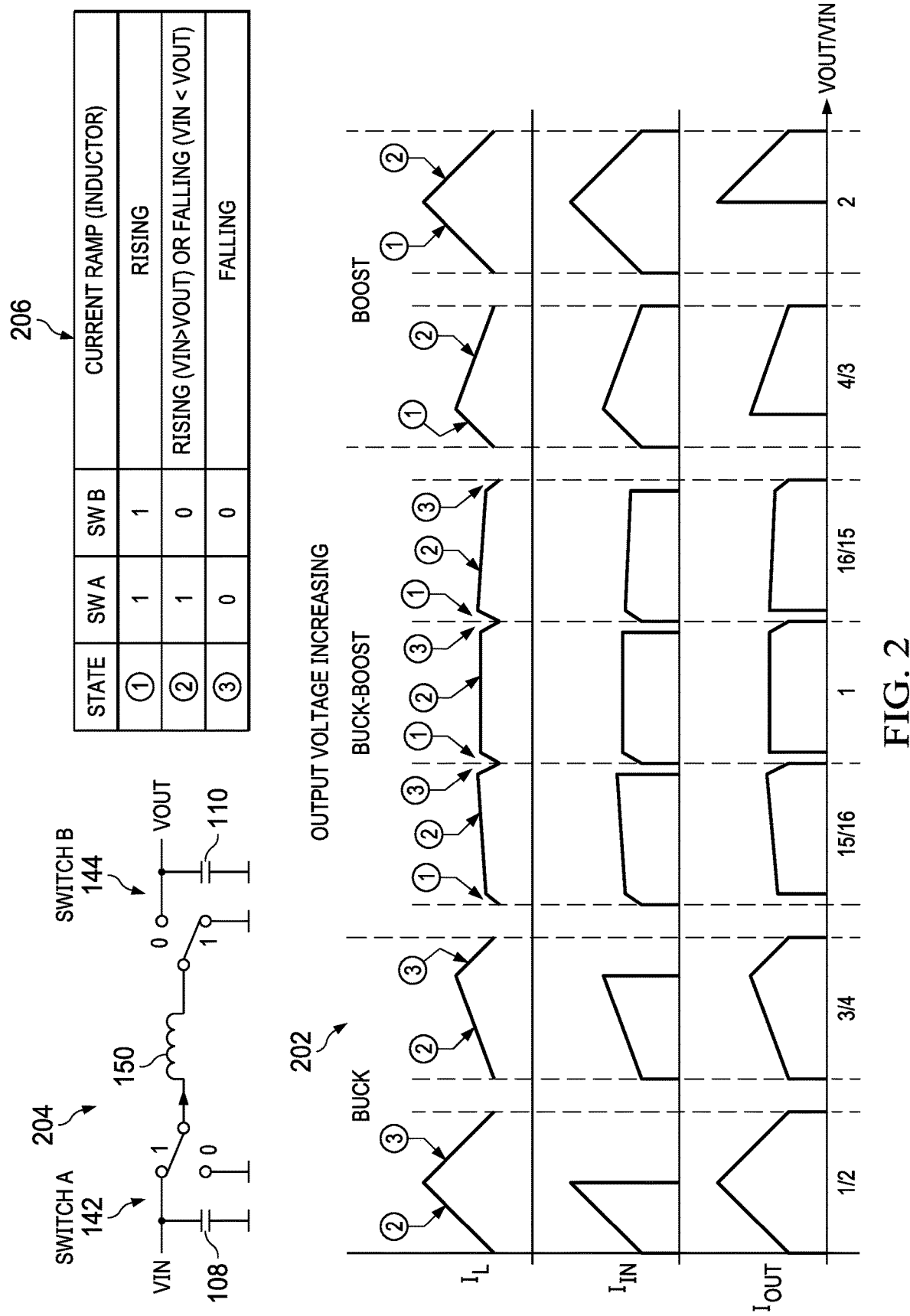
FIG. 2 is an illustration of operation of a voltage regulator and a current ramp through an inductor, according to embodiments of the present disclosure.

FIG. 2 is an illustration of operation of a voltage regulator 204 and a current ramp through inductor 150, according to embodiments of the present disclosure. Voltage regulator 204 may be an amended representation of voltage regulator 104 from FIG. 1. Voltage regulator 204 may represent buck leg 142 as a single switch, switch A. Switch A may be configured to connect the first end of inductor 150 to either potential VIN through input port 160 or to ground. Voltage regulator 204 may represent boost leg 144 as a single switch, switch B. Switch B may be configured to connect the second end of inductor 150 to either potential VOUT through output port 162 or to ground.

Table 206 illustrates different states of switches A and B and associated behavior of a current ramp of inductor 150. Buck controller circuit 124 and boost controller circuit 126 may be configured to output respective switching signals to cause switches A and B to be in a given state.

In a first state, switch A may connect potential VIN through input port 160 to the first end of inductor 150. Switch B may connect the second end of inductor 150 to ground. Current through inductor 150 may be rising.

In a second state, switch A may connect potential VIN through input port 160 to the first end of inductor 150. Switch B may connect the second end of inductor 150 to potential VOUT through output port 162. Current through inductor 150 may be rising if VIN is greater than VOUT, or falling if VIN is less than VOUT.

In a third state, switch A may connect ground to the first end of inductor 150. Switch B may connect the second end of inductor 150 to VOUT through output port 162. Current through inductor 150 may be falling.

Graph 202 illustrates current through inductor 150 ($I_L$), input current ($I_{in}$), and output current ($I_{out}$) for different values of the ratio of VOUT to VIN (VOUT/VIN). Thus, graph 202 illustrates such currents as VOUT is increasing from left to right, wherein potential VIN may be constant. Illustrated within graph 202 are buck, buck-boost, and boost modes with respect to such currents. For example, at a ratio of VOUT to VIN of 1/2, in buck mode, the switches may be in the second state while inductor current $I_L$ rises. Upon reaching a peak current value for $I_L$, the switches may be in the third state while the inductor current $I_L$ falls. Input current $I_{in}$ may rise in the second state and go to zero in the third state. Output current $I_{out}$ may rise in the second state and fall in the third state. In buck mode at yet higher output voltages, such as at a ratio VOUT to VIN of 3/4, the switches may again be in the second state while inductor current $I_L$ rises to a peak and then in the third state while inductor current $I_L$ falls. The slope of the inductor current $I_L$ at the ratio value of 3/4 may be less than the slope of the inductor current $I_L$ at the ration value of 1/2.

In another example, at a ratio of VOUT to VIN of 15/16, in buck-boost mode, the switches may be in the first state while inductor current $I_L$ rises, then may soon enter the second state where inductor current $I_L$ is mostly constant, rising only slightly. Upon reaching a peak current value, the switches may be in the third state while the inductor current $I_L$ falls. Input current $I_{in}$ may rise sharply in the first state, flatten out in the second state, and go to zero in the third state. Output current $I_{out}$ may be zero in the first state, instantly rise but flatten out in the second state, and fall in the third state. In the buck-boost mode at ratio values of 1 or 16/15, the currents may perform in a similar manner, albeit the slopes of current in the second state may be different when compared to the ratio of 15/16. For example, in the second state the slope of currents $I_L$, $I_{in}$, and $I_{out}$ at a ratio value of 1 may be flat; the slope of currents $I_L$, $I_{in}$, and $I_{out}$ at a ratio value of 15/16 may be slightly increasing; and the slope of currents $I_L$, $I_{in}$, and $I_{out}$ at a ratio value of 16/16 may be slightly decreasing.

In yet another example, at a ratio of VOUT to VIN of 4/3, in boost mode, the switches A and B may be in the first state while inductor current $I_L$ rises. Upon reaching a peak current value, the switches A and B may be in the second state while the inductor current falls. Input current $I_{in}$ may rise in the first state and fall in the second state. Output current $I_{out}$ may be zero in the first state and instantly rise but then fall in the second state. In buck mode at yet higher output voltages, such as at a ratio VOUT to VIN of 2, the switches A and B may again be in the first state while inductor current $I_L$ rises to a peak and then in the second state while inductor current $I_L$ falls. The slope of the inductor current $I_L$ at the ratio value of 4/3 may be less than the slope of the inductor current $I_L$ at the ration value of 2.

Returning to FIG. 1, the response of inductor current $I_L$ in FIG. 2 to different switching signals and to different output voltages may be used to determine switching signals to be issued by buck controller circuit 124 and boost controller circuit 126 to driver circuits 120, 122 which may in turn issue control signals to transistors 112, 114, 116, 118. The current set point or reference against which sensed current from current since 152 will be compared may be represented by a ramp dependent upon output voltage. Controller circuit 160 may include any suitable mechanism for generating current ramps to serve as references to buck controller circuit 124 and boost controller circuit 26. For example, controller circuit 160 may include a first slope compensation circuit 136 and a second slope compensation circuit 138. Slope compensation circuits 136, 138 may be implemented in any suitable manner such as by analog circuitry, digital circuitry, instructions for execution by a processor, or any suitable combination thereof. Slope compensation circuits 136, 138 may be configured to provide current ramp references and clock signals to buck controller circuit 124 and boost controller circuit 126. Thus, slope compensation circuits 136, 138 may be ramp generation circuits. The clock signals used by controller circuits 124, 126 may be provided by slope compensation circuits 136, 138 or other suitable portions of system 100, but circuits 124, 126, 136, 138 may each use a common or shared clock signal. Slope compensation circuits 136, 138 may be configured to receive a current set point 146. Based on current set point 146, slope compensation circuits 136, 138 may be configured to generate negative slope signals. If both slope compensation circuits 136, 138 are configured to use the same slope function, a single slope compensation circuit (not shown) placed in the current sense path, i.e. between current sense 152 and the respective inputs of comparators 128, 150 may replace slope compensation circuits 136, 138 and use a function that is the inverse of the functions of slope compensation circuits 136, 138.

The setpoint may be defined by current setpoint 146 included in controller circuit 160. Current setpoint 146 may be expressed as a voltage representing a particular current value, denoted $REFBUCK_0$. Current setpoint 146 may be provided by any suitable portion of system 100, such as from a voltage compensator (not shown), a register, or control logic. First slope compensation circuit 136 and second slope compensation circuit 138 may be configured to receive the value generated from current setpoint 146.

Figure 3:
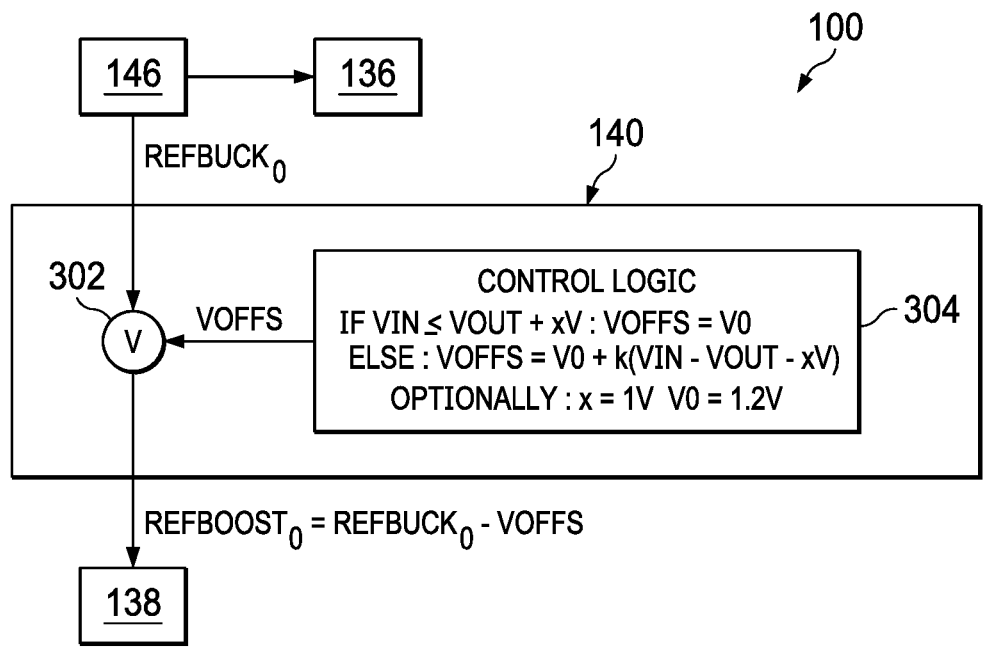
FIG. 3 illustrates further detail of a system, according to embodiments of the present disclosure.
Figure 4:
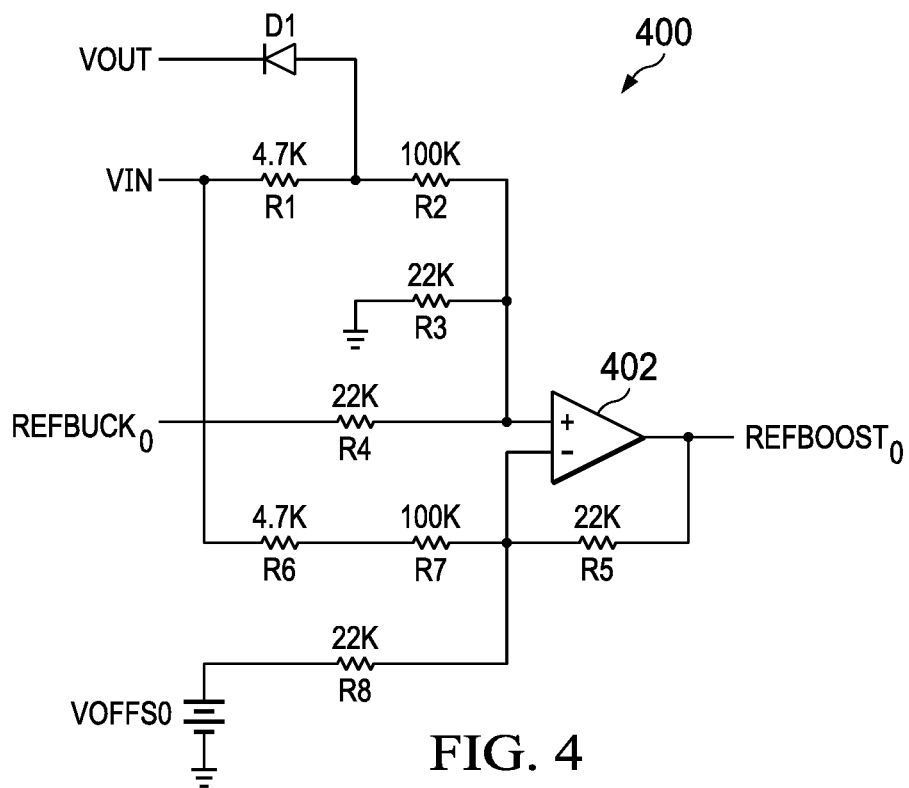
FIG. 4 is an illustration of an example implementation of an offset generator circuit, according to embodiments of the present disclosure.

In one embodiment, however, the value $REFBUCK_0$ generated by current setpoint 146 may be optionally modified before being provided to second slope compensation circuit 138. In a further embodiment, the value generated by current setpoint 146 may be offset by a determined offset value. The value of the offset and whether the offset is to be applied to current setpoint 146 before being provided to second slope compensation circuit 138 may be performed in any suitable manner. For example, controller circuit 160 may include an offset generator circuit 140. Offset generator circuit 140 may be configured to receive a value from current setpoint 146, may be connected to VIN through input port 160 and VOUT through output port 162, and provide a setpoint, $REFBOOST_0$, that is optionally modified from $REFBUCK_0$, to second slope compensation circuit 138. Offset generator circuit 140 may be implemented in any suitable manner, such as by analog circuitry, digital circuitry, instructions for execution by a processor, or any combination thereof. FIGS. 3-4 illustrate possible configuration and implementation of offset generator circuit 140.

Current setpoint 146 may be configured to set an initial value of a reference value that, when reached by current through inductor 150, may cause voltage regulator 104 to operate in a buck mode (or if voltage regulator 104 is also operating in a boost mode, to operate in a buck-boost mode). The reference value may be referred to as REFBUCK. The initial value of REFBUCK, $REFBUCK_0$, may be modified over time by first slope compensation circuit 136. The modification of REFBEUCK over time by first slope compensation circuit 136 may be expressed as REFBUCKRAMP. $REFBUCK_0$ may be used as an initial data point for first slope compensation circuit 136. First slope compensation circuit 136 may be configured to issue various values of REFBUCKRAMP according to a negative slope determination. For example, in a cycle of 0.004 ms, first slope compensation circuit 136 may issue the signal REFBUCKRAMP at an initial value of $REFBUCK_0$ as the initial output to be applied to buck controller circuit 124 as a setpoint. Over the course of the cycle of 0.004 ms, the value of REFBUCKRAMP issued by first slope compensation circuit 136 may decrease, and thus the setpoint to be used by buck controller circuit 124 may fall. Upon the start of a new cycle, first slope compensation circuit 136 may be configured to reissue the same initial value of REFBUCKRAMP, given by current setpoint 146 as $REFBUCK_0$.

Offset generator circuit 140 may be configured to apply an offset to the current setpoint 146 to yield an initial value of a reference value that, when reached by current through inductor 150, may cause voltage regulator 104 to operate in a boost mode (or if voltage regulator 104 is also operating in a buck mode, to operate in a buck-boost mode). The reference value may be referred to as REFBOOST, and an initial value may be referred to as $REFBOOST_0$. $REFBOOST_0$ may be modified over time by second slope compensation circuit 138, yielding a ramp signal of REFBOOSTRAMP. $REFBOOST_0$ may be used as an initial data point for second slope compensation circuit 138. Second slope compensation circuit 138 may be configured to issue REFBOOSTRAMP according to a negative slope determination. For example, in a cycle of 0.004 ms, second slope compensation circuit 138 may issue the initial value of REFBOOSTRAMP as $REFBOOST_0$ as the initial output to be applied to boost controller circuit 126 as a setpoint. Over the course of the cycle of 0.004 ms, the value of REFBOOSTRAMP issued by second slope compensation circuit 138 may decrease, and thus the setpoint to be used by boost controller circuit 126 may fall. Upon the start of a new cycle, second slope compensation circuit 138 may be configured to reissue the same initial value of REFBOOSTRAMP, given by offset generator circuit 140 as $REFBOOST_0$ based upon current setpoint 146, VIN, and VOUT. The variable offset, including, for example, changing the offset for buck mode, may facilitate gaining control over the transition buck-boost mode to buck mode. Without a variable offset, the range of operation buck-boost mode would be unnecessary wide. Unnecessary operation within buck-boost mode when buck mode operation would suffice may be inefficient.

FIG. 3 illustrates further detail of system 100, according to embodiments of the present disclosure. In particular, FIG. 3 may illustrate a functional implementation of offset generator circuit 140. Input from current setpoint 146 may be an initial value of REFBUCK, $REFBUCK_0$, that is to be passed on in parallel to first slope compensation circuit 136 for generating subsequent values of REFBUCK as REFBUCKRAMP in a given cycle, using REFBUCKRAMP as a buck reference current ramp, and to offset generator circuit 140. Output from offset generator circuit 140 may be an initial value of REFBOOST, given as $REFBOOST_0$, and may be passed to second slope compensation circuit 138 for generating further values of REFBOOST as REFBOOSTRAMP in a given cycle as a boost reference current ramp. Offset generator circuit 140 may be configured to offset $REFBUCK_0$, by any suitable amount of voltage with any suitable conditions to yield $REFBOOST_0$. In one embodiment, offset generator circuit 140 may include an additional controllable voltage source 302 configured to offset $REFBUCK_0$ to $REFBOOST_0$ according to criteria defined in a control logic 304 or another suitable circuitry. In a further embodiment, offset generator circuit 140 may be configured to apply a negative offset to $REFBUCK_0$ to yield t $REFBOOST_0$. The negative offset may be a negated value of a determined offset, VOFFS.

Control logic 304 may specify that VOFFS by default to be a flat, predetermined or set voltage, V0. V0 may be, for example, 1.2 V. VOFFS may be set to V0 if a present or instant value of VIN is less than or equal to the sum of a present or instant value of VOUT and another voltage, the other voltage given as x. The value of x may be, for example, 1 V. Thus, (VOFFS=V0) if (VIN≤(VOUT+x)). Otherwise, VOFFS may be set to V0 plus the product of a factor, k, and a sum of VIN less VOUT less x. Thus, (VOFFS=V0+k*(VIN−VOUT−x)) if (VIN>(VOUT+x)).

$REFBUCK_0$ may be equal to $REFBOOST_0$ less the determined value for VOFFS. If the operation of slope compensation circuits 136, 138 are the same, then REFBOOST may be equal to REFBUCK less the determined value for VOFFS for further values of REFBOOST and REFBUCK generated by slope compensation circuits 136, 138 in the form of REFBOOSTRAMP and REFBUCKRAMP. Thus, if the operation of slope compensation circuits 136, 138 are the same, then at all times REFBOOSTRAMP may be equal to REFBUCKRAMP less VOFFS.

Specific values for V0, k, and x may be selected according to particular implementations of system 100 and the stability needs of voltage regulator 104. V0 may be selected as approximately 90% of the slope ramp peak to peak amplitude. V0 may be determined by resistor values of offset generator circuit 140 or by software parameters or register values. The slope ramp may be a voltage signal added to the REFBUCK0 or REFBOOST0 values. In one embodiment, the slope ramp provided by slope compensation circuits 136, 138 may be the same. The signal may be in the form of, for example, a sawtooth signal. The slope and amplitude of the ramp signals may be chosen according to stability requirements. As current sense 152 is configured to perform a mapping of current values to voltage values, the ramps provided by slope compensation circuits 136, 138 may be voltage signals representative of current. The factor x may be approximately 5% of typical values of VIN or VOUT. In the example of system 100, V0 may be 1.2 V. The factor k may be 10%-20% of V0 per volt difference between VIN and VOUT. In the example of system 100, k may be 0.2. In the example of system 100, x may be 1 V. The factors k and x may be selected according to design considerations to set a range of operation of the buck-boost mode. Simultaneous operation of all four transistors 112, 114, 116, 118 may be inefficient and incur switching losses. Thus the duration of such simultaneous operation of all four transistors 112, 114, 116, 118 may be reduced by reducing a range of operation of the buck-boost mode. However, a transition from buck-boost mode to boost mode should not be excessively abrupt. Values of k and x may be determined through suitable simulation or practical evaluation.

Accordingly, VOFFS may be variable according to changes in VIN or VOUT. Moreover, REFBOOSTRAMP and REFBUCKRAMP may be applied, as shown in FIG. 1, as thresholds for buck controller 124 and boost controller 126 of voltage regulator 104 to compare with present inductor current. The results of such comparison may be used to operate voltage regulator 104 in boost mode, buck mode, or buck-boost mode. Thus, voltage regulator 104 may be configured to use VOFFS to change thresholds for entering boost mode, buck mode, or buck-boost mode.

FIG. 4 is an illustration of an example implementation of an offset generator circuit 400, according to embodiments of the present disclosure. Offset generator circuit 400 may be a more specific implementation of offset generator circuit 140. Offset generator circuit 400 may receive potential VIN and REFBUCK$_0$ as inputs. Offset generator circuit 400 may issue REFBOOST$_0$ as an output. Offset generator circuit 300 may be connected to potential VOUT.

VIN may be routed in parallel to two branches, wherein each branch includes a 4.7 kohm resistor connected to a 100 kohm resistor (R1-R2 and R6-R7, respectively). A midpoint between resistors R1 and R2 may be connected to a p-end of a diode D1. The n-end of diode D1 may be connected to VOUT. R2 may be connected to a non-inverting terminal of an op-amp 402. A 22 kohm resistor, R3, may also be connected between the non-inverting terminal of op-amp 402 and ground. REFBUCK$_0$ may may be connected to a first end of a 22 kohm resistor, R4, wherein a second end of which may in turn be connected to the non-inverting terminal of op-amp 402.

Resistor R7 may be connected to an inverting input of op-amp 402. Output of op-amp 402 may be routed as REFBOOST$_0$ and in feedback to a first end of a 22 kohm resistor, R5. A second end of resistor R5 may be connected to the inverting input of op-amp 402.

Offset generator circuit 400 may include a voltage source, VOFFS0. VOFFS0 may be configured to generate a voltage corresponding to the selected value of V0, such as 1.2 V. VOFFS0 may be configured to provide its output through a 22 kohm resistor, R8, to the inverting input of op-amp 402. The offset may be generated by, for example, forward voltage of diode D1, which may be further scaled by the resistor network of resistors R1, R2, R3, R4, R5, R6, R7, and R8.

Figure 5:
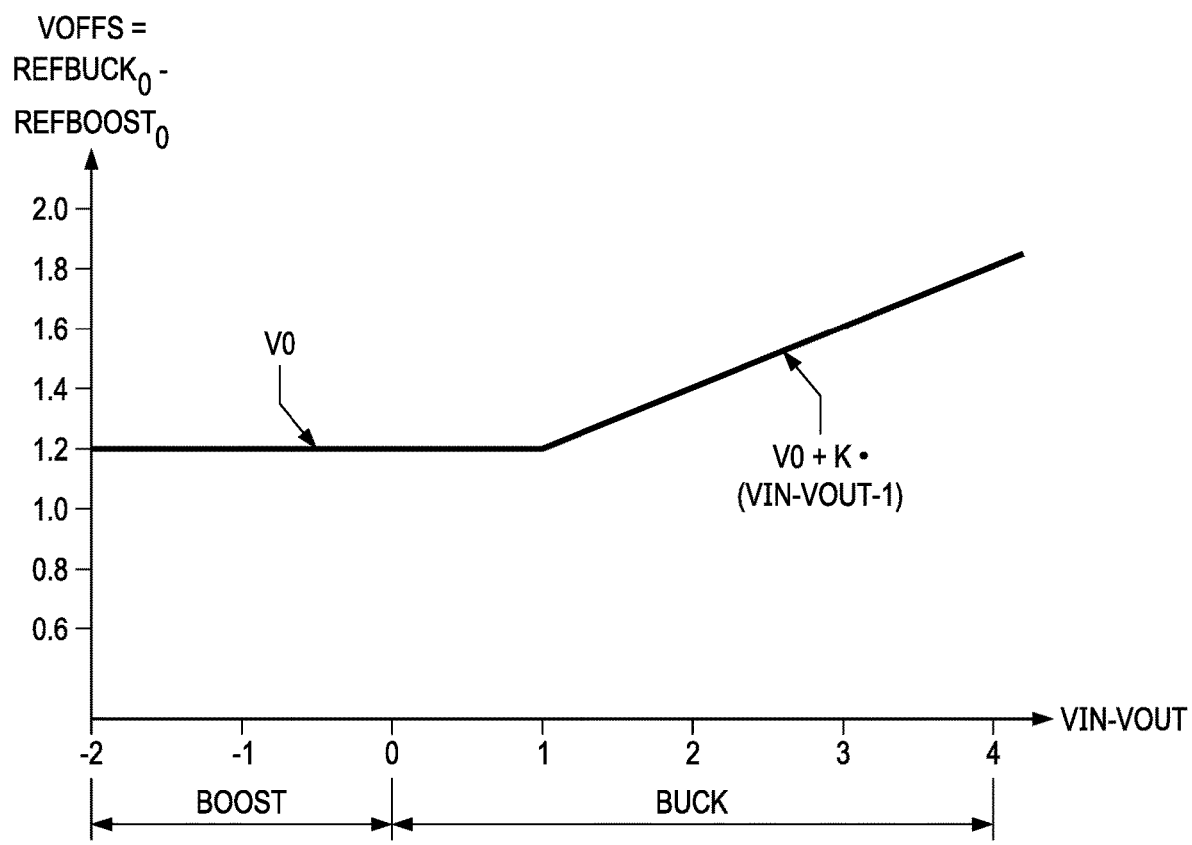
FIG. 5 is an illustration of the value of an offset voltage generated by an offset generation circuit for different values of input voltage and output voltage, according to embodiments of the present disclosure.

FIG. 5 is an illustration of the value of VOFFS generated by offset generation circuit 140 for different values of VIN and VOUT, according to embodiments of the present disclosure. VOFFS may be the difference between REFBUCK$_0$ and REFBOOST$_0$. Furthermore, VOFFS may vary according to the difference between VIN and VOUT. As shown in the figure, VOFFS may be equal to V0 for values of VIN minus VOUT that are less than one. When VIN minus VOUT equals one and continues to increase, VOFFS may begin to rise. The increase of the difference between VIN and VOUT may be a proxy for rising input voltage. VOFFS may begin to rise at a rate proportional to the factor k and to the difference between VIN and VOUT, less x. In the example of FIG. 5, V0 may be 1.2, k may be 0.2, and x may be 1.

Figure 6:
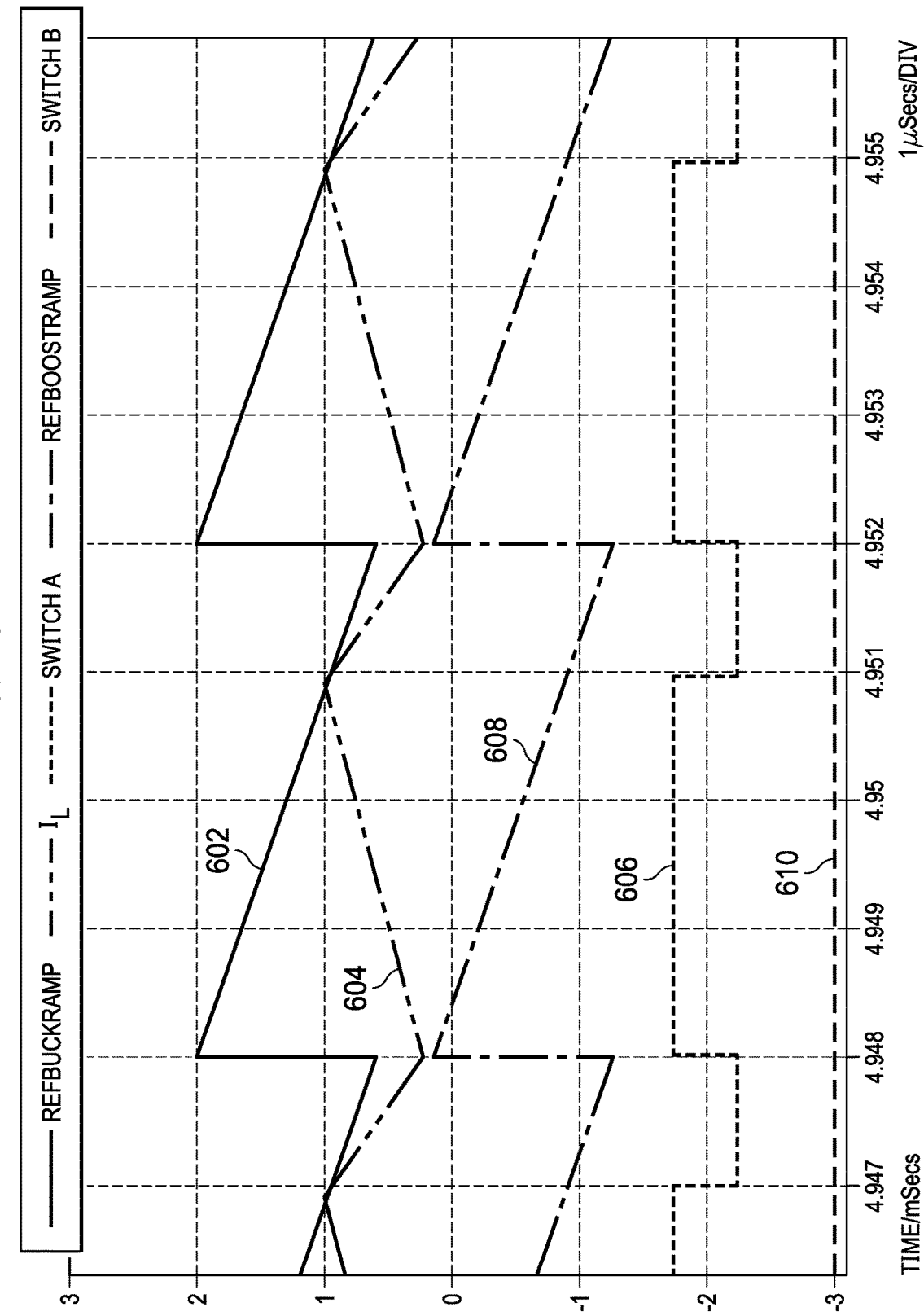
FIG. 6 is an illustration of example operation of a system in buck mode, according to embodiments of the present disclosure.

FIG. 6 is an illustration of example operation of system 100 in buck mode, according to embodiments of the present disclosure. The graph of FIG. 6 may be a further illustration of operation shown in FIG. 2 and graph 202 for buck mode of operation for values of VOUT/VIN of 1/2 or 3/4.

Illustrated are graphs of REFBUCKRAMP 602 as generated by first slope compensation circuit 136 to yield a buck reference current ramp, current 604 ($I_L$) through the inductor, operation 606 of switch A (also denoted as buck leg 142), REFBOOSTRAMP 608 as generated by second slope compensation circuit 138 to yield a boost reference current ramp, and operation 610 of switch B (also denoted as boost leg 144). These are graphed over a period of time. Operation of system 100 is illustrated for multiple instances of a cycle of operation. The cycle of operation may be 0.004 ms long. For example, operation may be analyzed starting at 4.948 ms in the graph. Operation 606 of switch A and operation 610 of switch B may be in accord with the operations shown in FIG. 2. That is, in operation 606, or in operation 610, respectively, when switch A or switch B is logically high or logically low, these may be closed or open as shown in FIG. 2. Furthermore, the rise or fall of current $I_L$ through the inductor, shown by graph 604, may be in accord with the operations shown in FIG. 2. Although shown as negative voltage values, the values in the graph of operation 606 of switch A and operation 610 of switch B merely represent either a logic high or a logic low condition. These switch values are shown at a particular voltage level only so as not to interfere with the graphs of the other values in the figure. Any suitable voltage level may be used for a logic high or logically low state.

REFBUCKRAMP 602 and REFBOOSTRAMP 608 may be offset by a particular voltage. Such an offset voltage may be set by offset generator circuit 140.

In buck mode, the inductor current $I_L$ as shown in graph 604 may rise at the start of the cycle at 4.948 ms, as in operation 606 of switch A may be turned on and in operation 610 of switch B may be turned off. This may correspond to state 2 in FIG. 2, as VIN is less than VOUT (as stated, system 100 is in buck mode). Shortly before 4.951 ms, the inductor current $I_L$ as shown in graph 604 may reach the limit provided by REFBUCKRAMP 602. At such a moment in time, operation 606 of switch A may be turned off. This may correspond to state 3 in FIG. 2. The inductor current $I_L$ as shown in graph 604 may then begin to fall until the end of the cycle at 4.952 ms. In the next cycle, operation 606 of switch A may again be turned on and the inductor current $I_L$ as shown in graph 604 may begin to rise again. During these operations, operation 610 of switch B may be off. Furthermore, the current $I_L$ as shown in graph 604 might never reach the limit of REFBOOSTRAMP 608.

Figure 7:
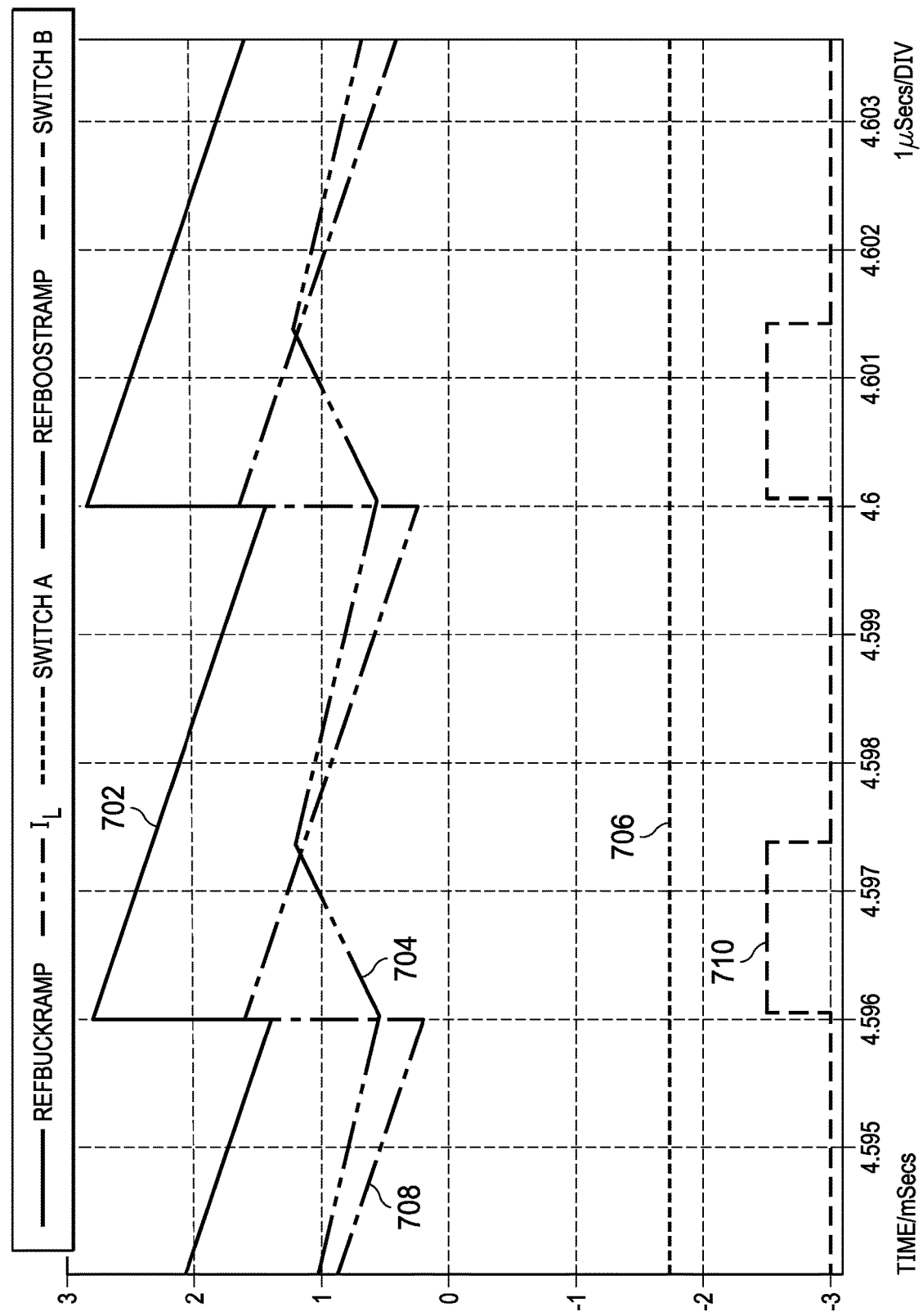
FIG. 7 is an illustration of example operation of a system in boost mode, according to embodiments of the present disclosure.

FIG. 7 is an illustration of example operation of system 100 in boost mode, according to embodiments of the present disclosure. The graph of FIG. 7 may be a further illustration of operation shown in FIG. 2 and graph 202 for boost mode of operation for values of VOUT/VIN of 4/3 or 2.

Illustrated are graphs of REFBUCKRAMP 702 as generated by first slope compensation circuit 136 to yield a buck reference current ramp, inductor current through the inductor $I_L$ as shown in graph 704, operation 706 of switch A (also denoted as buck leg 142), REFBOOSTRAMP 708 as generated by second slope compensation circuit 138 to yield a boost reference current ramp, and operation 710 of switch B (also denoted as boost leg 144). These are graphed over a period of time. Operation of system 100 is illustrated for multiple instances of a cycle of operation. The cycle of operation may be 0.004 ms long. For example, operation may be analyzed starting at 4.596 ms in the graph. Operation of switch A 706 and switch B 710 may be in accord with the operations shown in FIG. 2. Furthermore, the rise or fall of inductor current $I_L$ as shown in graph 704 may be in accord with the operations shown in FIG. 2. Although shown as negative voltage values, the values in the graph of operation 706 of switch A and operation 710 of switch B merely represent either a logic high or a logic low condition. These switch values are shown at a particular voltage level only so as not to interfere with the graphs of the other values in the figure. Any suitable voltage level may be used for a logic high or logically low state.

REFBUCKRAMP 702 and REFBOOSTRAMP 708 may be offset by a particular voltage. Such an offset voltage may be set by offset generator circuit 140.

In boost mode, the inductor current $I_L$ as shown in graph 704 may rise at the start of the cycle at 4.596 ms, as in operation 706 switch A may be turned on and operation 710 of switch B may be turned on. This may correspond to state 1 in FIG. 2. In FIG. 7 at 4.596 ms, operation 710 of switch B may be slightly delayed before turning on. In FIG. 6, for example, periodic signals REFBUCKRAMP 602, REFBOOSTRAMP 608, switch A (operation 606), and switch B (operation 610) signals may have shared the same phase. In FIG. 7, REFBOOSTRAMP 702 and switch B (operation 710) may be delayed as compared to REFBUCKRAMP 708 and switch A (operation 706). In various embodiments, system 100 may use a phase delay, such as approximately 500 ns, for activation of boost stages. This may provide inductor current $I_L$ as detected at current sense 152 sufficient time to rise at the start of a cycle. Current sense 152 might be unable to sense inductor current $I_L$ when high side transistor 112 is off. Due to the limited slew rate of any non-ideal current sensor, such as current sense 152, some time may pass after switching high side transistor 112 on before current sense 152 can correctly detect the current. The phase delay may prevent an otherwise inadvertent extension of State 1.

Shortly before 4.5975 ms, the inductor current $I_L$ as shown in graph 704 may reach the limit provided by REFBOOSTRAMP 708. At such a moment in time, operation 710 of switch B may be turned off. This may correspond to state two in FIG. 2. The inductor current $I_L$ as shown in graph 704 may then begin to fall, as VIN is less than VOUT (and thus state two's current falling condition exists, as system 100 is in boost mode) until the end of the cycle at 4.6 ms. In the next cycle, operation 710 of switch B may again be turned on and the inductor current $I_L$ as shown in graph 704 may begin to rise again. During these operations, operation 706 of switch A may be on. Furthermore, the inductor current $I_L$ as shown in graph 704 might never reach the limit of REFBUCKRAMP 702.

FIGS. 8-10 are illustrations of example operation of system 100 in buck-boost mode, according to embodiments of the present disclosure. In FIG. 8, system 100 may be in buck-boost mode wherein VIN is less than VOUT. In FIG. 9, system 100 may be in buck-boost mode wherein VIN is equal to VOUT. In FIG. 10, system 100 may be in buck-boost mode wherein VIN is greater than VOUT.

The graph of FIG. 8 may be a further illustration of operation shown in FIG. 2 and graph 202 for buck-boost mode of operation for values of VOUT/VIN of 16/15.

In FIG. 8, illustrated are graphs of REFBUCKRAMP 802 as generated by first slope compensation circuit 136 to yield a buck reference current ramp, current through the inductor $I_L$ as shown in graph 804, operation 806 of switch A (also denoted as buck leg 142), REFBOOSTRAMP 808 as generated by second slope compensation circuit 138 to yield a boost reference current ramp, and operation 810 of switch B (also denoted as boost leg 144). These are graphed over a period of time. Operation of system 100 is illustrated for multiple instances of a cycle of operation. The cycle of operation may be 0.004 ms long. For example, operation may be analyzed starting at 4.748 ms in the graph. Operation of switch A 806 and switch B 810 may be in accord with the operations shown in FIG. 2. Furthermore, the rise or fall of inductor current $I_L$ as shown in graph 804 may be in accord with the operations shown in FIG. 2. Although shown as negative voltage values, the values in the operations 806, 810 of switch A and switch B merely represent either a logic high or a logic low condition. These switch values are shown at a particular voltage level only so as not to interfere with the graphs of the other values in the figure. Any suitable voltage level may be used for a logic high or logically low state.

REFBUCKRAMP 802 and REFBOOSTRAMP 808 may be offset by a particular voltage. Such an offset voltage may be set by offset generator circuit 140.

In buck-boost mode, the inductor current $I_L$ as shown in graph 804 may rise at the start of the cycle at 4.748 ms, as operation 806 of switch A may be turned on and operation 810 of switch B may be turned on. This may correspond to state 1 in FIG. 2.

Shortly before 4.7485 ms, the inductor current $I_L$ as shown in graph 804 may reach the limit provided by REFBOOSTRAMP 808. At such a moment in time, operation 810 of switch B may be turned off. This may correspond to state two in FIG. 2. The inductor current $I_L$ as shown in graph 804 may then begin to slightly fall, as VIN is less than VOUT (and thus state two's current falling condition exists). Shortly before 4.752 ms, the inductor current $I_L$ as shown in graph 804 may reach the limit provided by REFBUCKRAMP 802. At such a moment in time, operation 806 of switch A may be turned off, corresponding to state three in FIG. 2. The inductor current $I_L$ as shown in graph 804 may then begin to fall at a more rapid rate until the end of the cycle at 4.752 ms.

In the next cycle, operation 810 of switch B and operation 806 of switch A may again be turned on and the inductor current $I_L$ as shown in graph 804 may begin to rise again.

The graph of FIG. 9 may be a further illustration of operation shown in FIG. 2 and graph 202 for buck-boost mode of operation for values of VOUT/VIN of 1.

In FIG. 9, illustrated are graphs of REFBUCKRAMP 902 as generated by first slope compensation circuit 136 to yield a buck reference current ramp, current through the inductor $I_L$ as shown in graph 904, operation 906 of switch A (also denoted as buck leg 142), REFBOOSTRAMP 908 as generated by second slope compensation circuit 138 to yield a boost reference current ramp, and operation 910 of switch B (also denoted as boost leg 144). These are graphed over a period of time. Operation of system 100 is illustrated for multiple instances of a cycle of operation. The cycle of operation may be 0.004 ms long. For example, operation may be analyzed starting at 4.772 ms in the graph. Operations 906, 910 of switch A and switch B may be in accord with the operations shown in FIG. 2. Furthermore, the rise or fall of inductor current $I_L$ as shown in graph 904 may be in accord with the operations shown in FIG. 2. Although shown as negative voltage values, the values in the graph of operations 906, 910 of switch A and switch B merely represent either a logic high or a logic low condition. These switch values are shown at a particular voltage level only so as not to interfere with the graphs of the other values in the figure. Any suitable voltage level may be used for a logic high or logically low state.

REFBUCKRAMP 902 and REFBOOSTRAMP 908 may be offset by a particular voltage. Such an offset voltage may be set by offset generator circuit 140.

In buck-boost mode, the inductor current $I_L$ as shown in graph 904 may rise at the start of the cycle at 4.772 ms, as operation 906 of switch A may be turned on and operation 910 of switch B may be turned on. This may correspond to state 1 in FIG. 2.

Shortly before 4.7725 ms, the inductor current $I_L$ as shown in graph 904 may reach the limit provided by REFBOOSTRAMP 908. At such a moment in time, operation 910 of switch B may be turned off. This may correspond to state two in FIG. 2. The inductor current $I_L$ as shown in graph 904 may then be flat, as VIN is equal to VOUT. Shortly before 4.776 ms, the inductor current $I_L$ as shown in graph 904 may reach the limit provided by REFBUCKRAMP 902. At such a moment in time, operation 906 of switch A may be turned off, corresponding to state three in FIG. 2. The inductor current $I_L$ as shown in graph 904 may then begin to fall until the end of the cycle at 4.776 ms.

In the next cycle, operation 910 of switch B and operation 906 of switch A may again be turned on and the inductor current $I_L$ as shown in graph 904 may begin to rise again.

The graph of FIG. 10 may be a further illustration of operation shown in FIG. 2 and graph 202 for buck-boost mode of operation for values of VOUT/VIN of 15/16.

In FIG. 10, illustrated are graphs of REFBUCKRAMP 1002 as generated by first slope compensation circuit 136 to yield a buck reference current ramp, inductor current as shown in graph 1004 through the inductor $I_L$, operation 1006 of switch A (also denoted as buck leg 142), REFBOOSTRAMP 1008 as generated by second slope compensation circuit 138 to yield a boost reference current ramp, and operation 1010 of switch B (also denoted as boost leg 144). These are graphed over a period of time. Operation of system 100 is illustrated for multiple instances of a cycle of operation. The cycle of operation may be 0.004 ms long. For example, operation may be analyzed starting at 4.788 ms in the graph. Operations 1006, 1010 of switch A and switch B respectively may be in accord with the operations shown in FIG. 2. Furthermore, the rise or fall of inductor current $I_L$ as shown in graph 1004 may be in accord with the operations shown in FIG. 2. Although shown as negative voltage values, the values in the graph of operations 1006, 1010 of switch A and switch B merely represent either a logic high or a logic low condition. These switch values are shown at a particular voltage level only so as not to interfere with the graphs of the other values in the figure. Any suitable voltage level may be used for a logic high or logically low state.

REFBUCKRAMP 1002 and REFBOOSTRAMP 1008 may be offset by a particular voltage. Such an offset voltage may be set by offset generator circuit 140.

In buck-boost mode, the inductor current $I_L$ as shown in graph 1004 may rise at the start of the cycle at 4.788 ms, as operation 1006 of switch A 1006 may be turned on and operation 1010 of switch B may be turned on. This may correspond to state 1 in FIG. 2.

Shortly before 4.7885 ms, the inductor current $I_L$ as shown in graph 1004 may reach the limit provided by REFBOOSTRAMP 1008. At such a moment in time, operation 1010 of switch B may be turned off. This may correspond to state two in FIG. 2. The inductor current $I_L$ as shown in graph 1004 may then begin to slightly rise, as VIN is greater than VOUT (and thus state two's current rising condition exists). At approximately 4.7915 ms, the current 804 may reach the limit provided by REFBUCKRAMP 1002. At such a moment in time, operation 1006 of switch A may be turned off, corresponding to state three in FIG. 2. The inductor current $I_L$ as shown in graph 1004 may then begin to fall until the end of the cycle at 4.792 ms.

In the next cycle, operation 1010 of switch B and operation 1006 of switch A may again be turned on and the inductor current $I_L$ as shown in graph 1004 may begin to rise again.

FIG. 11 is an illustration of example operation of system 100 during transition between buck-boost mode and boost mode while VOUT is increasing, according to embodiments of the present disclosure. In FIG. 11, illustrated are graphs of REFBUCKRAMP 1102 as generated by first slope compensation circuit 136 to yield a buck reference current ramp, current through the inductor ($I_L$) as shown in graph 1104, operation 1106 of switch A (also denoted as buck leg 142), REFBOOSTRAMP 1108 as generated by second slope compensation circuit 138 to yield a boost reference current ramp, and operation 1110 of switch B (also denoted as boost leg 144). Operation of system 100 is illustrated for multiple instances of a cycle of operation. Operations 1106, 1110 of switch A and switch B respectively may be in accord with the operations shown in FIG. 2. Furthermore, the rise or fall of inductor current $I_L$ as shown in graph 1104 may be in accord with the operations shown in FIG. 2. Although shown as negative voltage values, the values in the graph of operations 1106, 1110 of switch A and switch B merely represent either a logic high or a logic low condition. These switch values are shown at a particular voltage level only so as not to interfere with the graphs of the other values in the figure. Any suitable voltage level may be used for a logic high or logically low state.

As time passes in the graph of FIG. 11, VOUT/VIN may increase. This may be the result of, for example, VOUT increasing, VIN decreasing, or both. In the example of this figure, VOUT may be increasing as time elapses.

REFBUCKRAMP 1102 and REFBOOSTRAMP 1108 may be offset by a particular voltage. Such an offset voltage may be set by offset generator circuit 140. Moreover, as VOUT is increasing, the offset may also be changing. Such an offset may be changing according to, for example, FIG. 5 and its associated discussion above.

At the start of the graph, system 100 may be in buck-boost mode, similar to the operations shown above within the context of FIG. 8. As time goes on, the amount of time in which operation 1006 of switch A is turned off may decrease, as inductor current $I_L$ as shown in graph 1104 needs less and less time reaching REFBUCKRAMP 1102. By the time operation of system 100 reaches 3.455 ms, additional cycles will not include inductor current $I_L$ as shown in graph 1104 reaching the limit of REFBUCK-RAMP 1102. Consequently, system 100 may thus be in boost mode. Operation in such a mode may be similar to the operation of FIG. 7, above.

FIG. 12 is an illustration of example operation of system 100 during transition between boost mode and buck-boost mode while VOUT is decreasing, according to embodiments of the present disclosure.

In FIG. 12, illustrated are graphs of REFBUCKRAMP 1202 as generated by first slope compensation circuit 136 to yield a buck reference current ramp, current through the inductor ($I_L$) as shown in graph 1204, operation 1206 of switch A (also denoted as buck leg 142), REFBOOSTRAMP 1208 as generated by second slope compensation circuit 138 to yield a boost reference current ramp, and operation 1210 of switch B (also denoted as boost leg 144). Operation of system 100 is illustrated for multiple instances of a cycle of operation. Operation 1206, 1210 of switch A and switch B respectively may be in accord with the operations shown in FIG. 2. Furthermore, the rise or fall inductor current $I_L$ as shown in graph 1204 may be in accord with the operations shown in FIG. 2. Although shown as negative voltage values, the values in the graph of operations 1206, 1210 switch A and switch B merely represent either a logic high or a logic low condition. These switch values are shown at a particular voltage level only so as not to interfere with the graphs of the other values in the figure. Any suitable voltage level may be used for a logic high or logically low state.

As time passes in the graph of FIG. 12, VOUT/VIN may decrease. This may be the result of, for example, VOUT decreasing, VIN increasing, or both. In the example of this figure, VOUT may be decreasing as time elapses.

REFBUCK 1202 RAMP and REFBOOSTRAMP 1208 may be offset by a particular voltage. Such an offset voltage may be set by offset generator circuit 140. Moreover, as VOUT is decreasing, the offset may also be changing. Such an offset may be changing according to, for example, FIG. 5 and its associated discussion above.

In particular, the offset between REFBUCKRAMP 1102 and REFBOOSTRAMP 1108 may increase as VOUT decreases.

At the start of the graph, system 100 may be in boost mode. Operation in such a mode may be similar to the operation of FIG. 7, above. As time goes on, the amount of time required for inductor current $I_L$ as shown in graph 1204 to reach REFBOOSTRAMP 1208 may decrease. This may be due to the increasing offset, pushing REFBOOSTRAMP 1208 downward. In addition, at first, inductor current $I_L$ as shown in graph 1204 might not reach REFBUCKRAMP 1202 and thus system 100 may operate in boost mode. As time goes on, inductor current $I_L$ as shown in graph 1204 may reach REFBUCKRAMP 1202 in subsequent cycles. System 100 may then be in buck-boost mode, similar to the operation of FIG. 8, above. As even more time goes on, inductor current $I_L$ as shown in graph 1204 may reach REFBUCKRAMP 1202 sooner and sooner. This may also be due to the offset increasing. Furthermore, with VOUT decreasing, inductor current $I_L$ as shown in graph 1204 may become flatter during its stage two operation, so that inductor current $I_L$ as shown in graph 1204 may reach REFBUCK-RAMP 1202 close to the end of the period.

FIG. 13 is an illustration of example operation of system 100 during transition between buck mode and buck-boost mode while VOUT is increasing, according to embodiments of the present disclosure. In FIG. 13, illustrated are graphs of REFBUCKRAMP 1302 as generated by first slope compensation circuit 136 to yield a buck reference current ramp, current ($I_L$) through the inductor as shown in graph 1304, operation 1306 of switch A (also denoted as buck leg 142), REFBOOSTRAMP 1308 as generated by second slope compensation circuit 138 to yield a boost reference current ramp, and operation 1310 of switch B (also denoted as boost leg 144). Operation of system 100 is illustrated for multiple instances of a cycle of operation. Operation 1306, 1310 of switch A and switch B respectively may be in accord with the operations shown in FIG. 2. Furthermore, the rise or fall of inductor current $I_L$ as shown in graph 1304 may be in accord with the operations shown in FIG. 2. Although shown as negative voltage values, the values in the graph of operations 1306, 1310 of switch A and switch B merely represent either a logic high or a logic low condition. These switch values are shown at a particular voltage level only so as not to interfere with the graphs of the other values in the figure. Any suitable voltage level may be used for a logic high or logically low state.

As time passes in the graph of FIG. 13, VOUT/VIN may increase. This may be the result of, for example, VOUT increasing, VIN decreasing, or both. In the example of this figure, VOUT may be increasing as time elapses.

REFBUCKRAMP 1302 and REFBOOSTRAMP 1308 may be offset by a particular voltage. Such an offset voltage may be set by offset generator circuit 140. Moreover, as VOUT is increasing, the offset may also be changing. Such an offset may be changing according to, for example, FIG. 5 and its associated discussion above.

In particular, the offset between REFBUCKRAMP 1302 and REFBOOSTRAMP 1308 may decrease as VOUT increases. As shown in FIG. 13, over time REBOOSTRAMP 1308 may increase to become closer to REFBUCKRAMP 1302.

At the start of the graph, system 100 may be in buck mode, similar to the operations shown above within the context of FIG. 6. Operation 1310 of Switch B may be off. Inductor current $I_L$ as shown in graph 1304 might not reach REFBOOSTRAMP 1308. As time goes on, current 1304 may begin to reach REFBOOSTRAMP 1308. At such a time, operation 1310 of switch B may begin to be switched on for those times in which inductor current $I_L$ as shown in graph 1304 reaches REFBOOSTRAMP 1308. Consequently, system 100 may thus be in buck-boost mode. The operation of system 100 within buck-boost mode may resemble the operation shown in FIG. 10.

FIG. 14 is an illustration of example operation of system 100 during transition between buck-boost mode and buck mode while VOUT is decreasing, according to embodiments of the present disclosure.

In FIG. 14, illustrated are graphs of REFBUCKRAMP 1402 as generated by first slope compensation circuit 136 to yield a buck reference current ramp, current ($I_L$) through the inductor as shown in graph 1404, operation 1406 of switch A (also denoted as buck leg 142), REFBOOSTRAMP 1408 as generated by second slope compensation circuit 138 to yield a boost reference current ramp, and operation 1410 of switch B (also denoted as boost leg 144). Operation of system 100 is illustrated for multiple instances of a cycle of operation. Operations 1406, 1410 of switch A and switch B respectively may be in accord with the operations shown in FIG. 2. Furthermore, the rise or fall of inductor current $I_L$ as shown in graph 1404 may be in accord with the operations shown in FIG. 2. Although shown as negative voltage values, the values in the graph of operations 1406, 1410 of switch A and switch B merely represent either a logic high or a logic low condition. These switch values are shown at a particular voltage level only so as not to interfere with the graphs of the other values in the figure. Any suitable voltage level may be used for a logic high or logically low state.

As time passes in the graph of FIG. 14, VOUT/VIN may decrease. This may be the result of, for example, VOUT decreasing, VIN increasing, or both. In the example of this figure, VOUT may be decreasing as time elapses.

REFBUCKRAMP 1402 and REFBOOSTRAMP 1408 may be offset by a particular voltage. Such an offset voltage may be set by offset generator circuit 140. Moreover, as VOUT is decreasing, the offset may also be changing. Such an offset may be changing according to, for example, FIG. 5 and its associated discussion above.

In particular, the offset between REFBUCKRAMP 1402 and REFBOOSTRAMP 1408 may increase as VOUT decreases. REFBOOSTRAMP 1408 may pull away from REFBUCKRAMP 1402 as REFBOOSTRAMP 1408 decreases as the offset increases. Over time, inductor current $I_L$ as shown in graph 1404 might not cross REFBOOSTRAMP 1408.

At the start of the graph, system 100 may be in buck-boost mode. As time goes on, the amount of time required for inductor current $I_L$ as shown in graph 1404 to reach REFBOOSTRAMP 1408 may increase. This may be due to the increasing offset, pushing REFBOOSTRAMP 1408 downward. Operation 1410 of switch B 1410 may be switched on for less and less time. As time goes on, inductor current $I_L$ as shown in graph 1204 may eventually not reach REFBOOSTRAMP 1408 in subsequent cycles. System 100 may then be in buck mode.

Although example embodiments have been described above, other variations and embodiments may be made from this disclosure without departing from the spirit and scope of these embodiments.

What is claimed is:

1. A power converter, comprising:
   an inductor;
   a boost leg circuit coupled to a first end of the inductor, the boost leg circuit configured to operate the power converter in boost mode;
   a buck leg circuit coupled to a second end of the inductor, the buck leg circuit configured to operate the power converter in buck mode; and
   a controller circuit configured to:
      determine a current through the inductor;
      generate a buck reference configured to be compared with the current through the inductor to control operation of the buck leg circuit;
      calculate a variable offset based upon input and output potentials of the power converter and apply the variable offset to the buck reference to generate a boost reference;
      compare the boost reference with the current through the inductor to control operation of the boost leg circuit;
      based upon comparisons of the current through the inductor with the buck reference and the boost reference, respectively, operate the boost leg circuit and the buck leg circuit; and
      when the input potential of the power converter is greater than the sum of the output potential of the power converter and a fixed voltage, vary the variable offset linearly with respect to a difference between the input potential of the power converter and a sum of the output potential of the power converter and the fixed voltage.

2. The power converter of claim 1, wherein the controller circuit is further configured to:
   generate the buck reference as a buck reference ramp; and
   generate the boost reference as a boost reference ramp;
   wherein the buck reference ramp and the boost reference ramp are separated by the variable offset.

3. The power converter of claim 1, wherein the controller circuit is further configured to calculate the variable offset according to an instant input potential to the power converter.

4. The power converter of claim 1, wherein the controller circuit is further configured to calculate the variable offset according to an instant output potential from the power converter.

5. The power converter of claim 1, wherein the controller circuit is further configured to calculate the variable offset as a constant value when the input potential to the power converter is less than the sum of the output potential and a fixed voltage.

6. The power converter of claim 1, wherein the variable offset is configured to change thresholds to operate the power converter in boost mode, buck-boost mode, or buck mode.

7. A power converter of claim 1, wherein the controller circuit is further configured to:
   utilize the buck reference and the boost reference to operate the boost leg circuit and the buck leg circuit in a boost mode; and
   utilize the buck reference and the boost reference to operate the boost leg circuit and the buck leg circuit in a buck mode.

8. A system, comprising:
   a voltage input;
   a load;
   and a power converter configured to provide voltage to the load based on the voltage input, the power converter comprising:
      an inductor;
      a boost leg circuit coupled to a first end of the inductor, the boost leg circuit configured to operate the power converter in boost mode;
      a buck leg circuit coupled to a second end of the inductor, the buck leg circuit configured to operate the power converter in buck mode; and
      a controller circuit configured to:
         determine a current through the inductor;
         generate a buck reference configured to be compared with the current through the inductor to control operation of the buck leg circuit;
         calculate a variable offset based upon input and output potentials of the power converter and apply the variable offset to the buck reference to generate a boost reference;
         compare the boost reference with the current through the inductor to control operation of the boost leg circuit;
         based upon comparisons of the current through the inductor with the buck reference and the boost reference, respectively, operate the boost leg circuit and the buck leg circuit; and when the input potential of the power converter is greater than the sum of the output potential of the power converter and a fixed voltage, vary the variable offset linearly with respect to a difference between the input potential of the power converter and a sum of the output potential of the power converter and the fixed voltage.

9. The system of claim 8, wherein the controller circuit is further configured to:
generate the buck reference as a buck reference ramp; and
generate the boost reference as a boost reference ramp;
wherein the buck reference ramp and the boost reference ramp are separated by the variable offset.

10. The system of claim 8, wherein the controller circuit is further configured to calculate the variable offset according to an instant input potential to the power converter.

11. The system of claim 8, wherein the controller circuit is further configured to calculate the variable offset according to an instant output potential from the power converter.

12. A method, comprising:
operating a power converter in boost mode and buck mode, the power converter including:
an inductor;
a boost leg circuit coupled to a first end of the inductor; and
a buck leg circuit coupled to a second end of the inductor;
determining a current through the inductor;
generating a buck reference;
comparing the buck reference with the current through the inductor to control operation of the buck leg circuit;
calculating a variable offset based upon input and output potentials of the power converter;
applying the variable offset to the buck reference to generate a boost reference;
comparing the boost reference with the current through the inductor to control operation of the boost leg circuit;
based upon comparisons of the current through the inductor with the buck reference and the boost reference, respectively, operating the boost leg circuit and the buck leg circuit;
when the input potential of the power converter is greater than the sum of the output potential of the power converter and a fixed voltage, varying the variable offset linearly with respect to a difference between the input potential of the power converter and a sum of the output potential of the power converter and the fixed voltage.

13. The method of claim 12, further comprising:
generating the buck reference as a buck reference ramp; and
generating the boost reference as a boost reference ramp;
wherein the buck reference ramp and the boost reference ramp are separated by the variable offset.

14. The method of claim 12, further comprising calculating the variable offset according to an instant input potential to the power converter.

15. The method of claim 12, further comprising calculating the variable offset according to an instant output potential from the power converter.

16. The method of claim 12, further comprising calculating the variable offset as a constant value when the input potential to the power converter is less than the sum of the output potential and a fixed voltage.

17. The method of claim 12, further comprising, with the variable offset, changing thresholds to operate the power converter in boost mode, buck-boost mode, or buck mode.

18. A power converter, comprising:
an inductor;
a boost leg circuit coupled to a first end of the inductor, the boost leg circuit configured to operate the power converter in boost mode;
a buck leg circuit coupled to a second end of the inductor, the buck leg circuit configured to operate the power converter in buck mode; and
a controller circuit configured to:
determine a current through the inductor;
generate a buck reference configured to be compared with the current through the inductor to control operation of the buck leg circuit;
calculate a variable offset based upon input and output potentials of the power converter and apply the variable offset to the buck reference to generate a boost reference;
compare the boost reference with the current through the inductor to control operation of the boost leg circuit;
based upon comparisons of the current through the inductor with the buck reference and the boost reference, respectively, operate the boost leg circuit and the buck leg circuit;
utilize the buck reference and the boost reference to operate the boost leg circuit and the buck leg circuit in a boost mode; and
utilize the buck reference and the boost reference to operate the boost leg circuit and the buck leg circuit in a buck mode; and
utilize the buck reference and the boost reference to operate the boost leg circuit and the buck leg circuit in a buck-boost mode.

19. A system, comprising:
a voltage input;
a load;
and a power converter configured to provide voltage to the load based on the voltage input, the power converter comprising:
an inductor;
a boost leg circuit coupled to a first end of the inductor, the boost leg circuit configured to operate the power converter in boost mode;
a buck leg circuit coupled to a second end of the inductor, the buck leg circuit configured to operate the power converter in buck mode; and
a controller circuit configured to:
determine a current through the inductor;
generate a buck reference configured to be compared with the current through the inductor to control operation of the buck leg circuit;
calculate a variable offset based upon input and output potentials of the power converter and apply the variable offset to the buck reference to generate a boost reference;
compare the boost reference with the current through the inductor to control operation of the boost leg circuit;
based upon comparisons of the current through the inductor with the buck reference and the boost reference, respectively, operate the boost leg circuit and the buck leg circuit;

utilize the buck reference and the boost reference to operate the boost leg circuit and the buck leg circuit in a boost mode; and utilize the buck reference and the boost reference to operate the boost leg circuit and the buck leg circuit in a buck mode; and utilize the buck reference and the boost reference to operate the boost leg circuit and the buck leg circuit in a buck-boost mode.

20. A method, comprising:

operating a power converter in boost mode and buck mode, the power converter including:
  an inductor;
  a boost leg circuit coupled to a first end of the inductor; and
  a buck leg circuit coupled to a second end of the inductor;

determining a current through the inductor;

generating a buck reference;

comparing the buck reference with the current through the inductor to control operation of the buck leg circuit;

calculating a variable offset based upon input and output potentials of the power converter;

applying the variable offset to the buck reference to generate a boost reference;

comparing the boost reference with the current through the inductor to control operation of the boost leg circuit;

based upon comparisons of the current through the inductor with the buck reference and the boost reference, respectively, operating the boost leg circuit and the buck leg circuit;

utilizing the buck reference and the boost reference to operate the boost leg circuit and the buck leg circuit in a boost mode; and utilizing the buck reference and the boost reference to operate the boost leg circuit and the buck leg circuit in a buck mode; and utilizing the buck reference and the boost reference to operate the boost leg circuit and the buck leg circuit in a buck-boost mode.

* * * * *